(12) United States Patent
Yu

(10) Patent No.: US 9,955,801 B2
(45) Date of Patent: May 1, 2018

(54) BABY CARRIAGE

(71) Applicant: Wonderland Switzerland AG, Steinhausen (CH)

(72) Inventor: Fu-Sian Yu, Guangdong (CN)

(73) Assignee: Wonderland Switzerland AG, Steinhausen (CH)

( * ) Notice: Subject to any disclaimer, the term of this patent is extended or adjusted under 35 U.S.C. 154(b) by 0 days. days.

(21) Appl. No.: 15/401,102

(22) Filed: Jan. 9, 2017

(65) Prior Publication Data

US 2017/0367495 A1    Dec. 28, 2017

(30) Foreign Application Priority Data

Jun. 22, 2016  (CN) .......................... 2016 1 0458484
Aug. 25, 2016  (CN) .......................... 2016 1 0724410

(51) Int. Cl.
| A47C 27/00 | (2006.01) |
| A47D 15/00 | (2006.01) |
| A47D 13/02 | (2006.01) |
| A47D 9/00  | (2006.01) |
| A47D 1/00  | (2006.01) |
| B60N 2/26  | (2006.01) |
| A47C 31/00 | (2006.01) |
| A47D 9/02  | (2006.01) |
| A47D 13/10 | (2006.01) |
| A47D 7/00  | (2006.01) |

(52) U.S. Cl.
CPC ............ *A47D 15/001* (2013.01); *A47C 31/00* (2013.01); *A47D 1/008* (2013.01); *A47D 9/00* (2013.01); *A47D 9/02* (2013.01); *A47D 13/025* (2013.01); *A47D 13/105* (2013.01); *B60N 2/26* (2013.01)

(58) Field of Classification Search
CPC .......... A47C 27/00; A47D 7/00; A47D 13/00; A47D 13/06; A47D 15/00
USPC .......... 446/227; 5/93.1, 99.1, 691, 722, 723, 5/724, 725
See application file for complete search history.

(56) References Cited

U.S. PATENT DOCUMENTS 7,065,814 B2   6/2006 Rutkowski
2007/0214576 A1*  9/2007 Espenshade ......... A47D 13/063
5/723

(Continued)

FOREIGN PATENT DOCUMENTS

| GB | 1008185    | 10/1965 |
| JP | H07-17150 U | 3/1995 |
| JP | H07-117678 A | 5/1995 |

(Continued)

*Primary Examiner* — Kien Nguyen
(74) *Attorney, Agent, or Firm* — Winston Hsu

(57) ABSTRACT

A baby carriage comprises a frame and a cushion. The cushion is disposed on the frame. The cushion comprises a plurality of reinforcing plates and a fabric cover. The reinforcing plates are disposed in the fabric cover. The reinforcing plates are arranged side by side and separated from each other. At least one of the reinforcing plates comprises a plate body and a first reinforcing rib. The plate body has a plurality of through holes formed thereon. The first reinforcing rib is located on a bottom surface of the plate body. The first reinforcing rib comprises a straight section and a curved section. The curved section extends from the straight section. A gap exists between an end of the curved section and one of the straight section and the curved section.

27 Claims, 21 Drawing Sheets

(56) References Cited

U.S. PATENT DOCUMENTS

2013/0076084 A1  3/2013 Ho
2013/0276238 A1* 10/2013 Vega-Woller ........ A47D 15/003
                                                              5/703

FOREIGN PATENT DOCUMENTS

| JP | H08-252151 A | 10/1996 |
| JP | H10-295486 A | 11/1998 |
| JP | 2008-510503 A | 4/2008 |
| JP | 2011-167514 A | 9/2011 |
| JP | 2014-144741 A | 8/2014 |
| WO | 2007109653 A2 | 9/2007 |
| WO | 2016033076 A1 | 3/2016 |
| WO | 2016/094372 A1 | 6/2016 |

* cited by examiner

BABY CARRIAGE

CROSS REFERENCE TO RELATED APPLICATION

This application claims the benefit of China Application No. 201610458484.3, which was filed on Jun. 22, 2016, China Application No. 201610724410.X, which was filed on Aug. 25, 2016, and are incorporated herein by reference.

BACKGROUND OF THE INVENTION

1. Field of the Invention

The invention relates to a baby carriage and, more particularly, to a baby carriage equipped with a cushion capable of reinforcing structural strength and improving ventilation.

2. Description of the Prior Art

For parents or a caregiver, a baby carriage is a very practical tool for accommodating a baby. In general, the baby carriage is usually equipped with a cushion, such that the baby can lie on the cushion. Since the baby may play in the baby carriage sometimes, the safety of the baby may be threatened if the structural strength of cushion is not enough. Furthermore, when the baby lies on the cushion, the baby may feel uncomfortable if the ventilation of the cushion is not good. Moreover, the baby may suffocate if the mouth and nose of the baby are covered by the cushion. Consequently, it may cause a heavy psychological burden on the parents or caregiver.

SUMMARY OF THE INVENTION

The invention provides a baby carriage equipped with a cushion capable of reinforcing structural strength and improving ventilation, so as to solve the aforesaid problems.

According to an embodiment of the invention, a baby carriage comprises a frame and a cushion. The cushion is disposed on the frame. The cushion comprises a plurality of reinforcing plates and a fabric cover. The reinforcing plates are disposed in the fabric cover. The reinforcing plates are arranged side by side and separated from each other. At least one of the reinforcing plates comprises a plate body and a first reinforcing rib. The plate body has a plurality of through holes formed thereon. The first reinforcing rib is located on a bottom surface of the plate body. The first reinforcing rib comprises a straight section and a curved section. The curved section extends from the straight section. A gap exists between an end of the curved section and one of the straight section and the curved section.

As mentioned in the above, the invention disposes the reinforcing rib on the bottom surface of the reinforcing plate, so as to reinforce structural strength of the reinforcing plate by the reinforcing rib. Since the gap exists between the end of the curved section and one of the straight section and the curved section (i.e. the end of the curved section is not connected to the straight section or the curved section), stress concentration will not occur when the reinforcing rib is forced by an external force, such that the reinforcing plate will not break or be damaged easily. Furthermore, the reinforcing rib of the invention may be P-shaped, such that a non-closed space may be formed between a part of the straight section and the curved section. Since some through holes are located in the non-closed space formed by the reinforcing rib, the through holes in the non-closed space can contact with a baby sufficiently when the baby lies on the cushion, so as to improve ventilation, enhance coziness and reduce suffocation risk. Moreover, the cushion of the invention can be applied to different baby carriages including a crib, a stroller, a bedside bed, a carry cot, a rocker, a dining chair, a swing, a car seat, a bouncer, a high chair, an infant car seat, and so on.

These and other objectives of the present invention will no doubt become obvious to those of ordinary skill in the art after reading the following detailed description of the preferred embodiment that is illustrated in the various figures and drawings.

DETAILED DESCRIPTION

Since a cushion of the invention can be applied to different baby carriages (e.g. a crib, a stroller, a bedside bed, a carry cot, a rocker, a dining chair, a swing, a car seat, a bouncer, a high chair, an infant car seat, and so on), the cushion of the invention will be depicted in the following first and then various baby carriages, which can be used with the cushion, are depicted.

Figure 1:
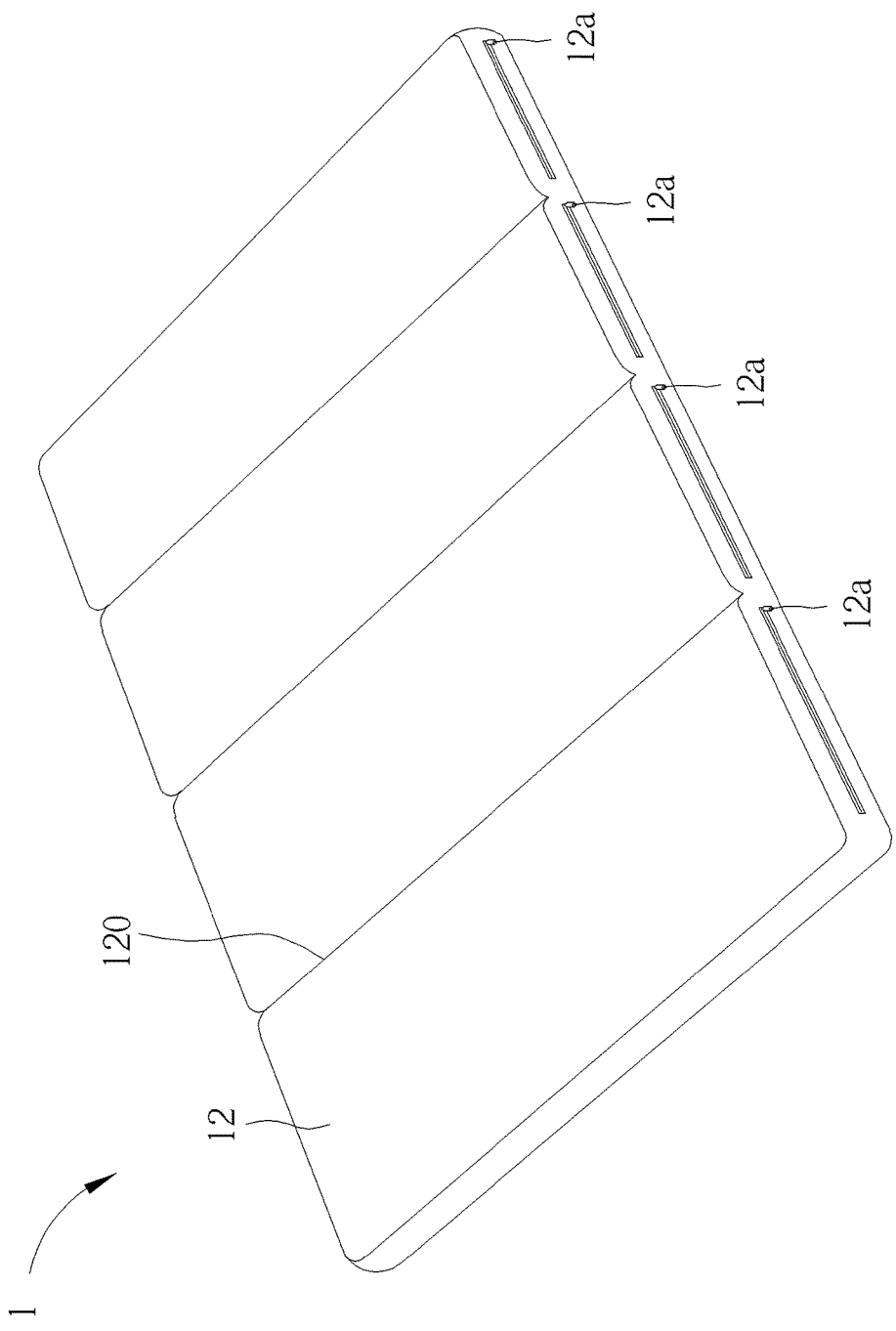
FIG. 1 is a perspective view illustrating a cushion according to a first embodiment of the invention.
Figure 2:
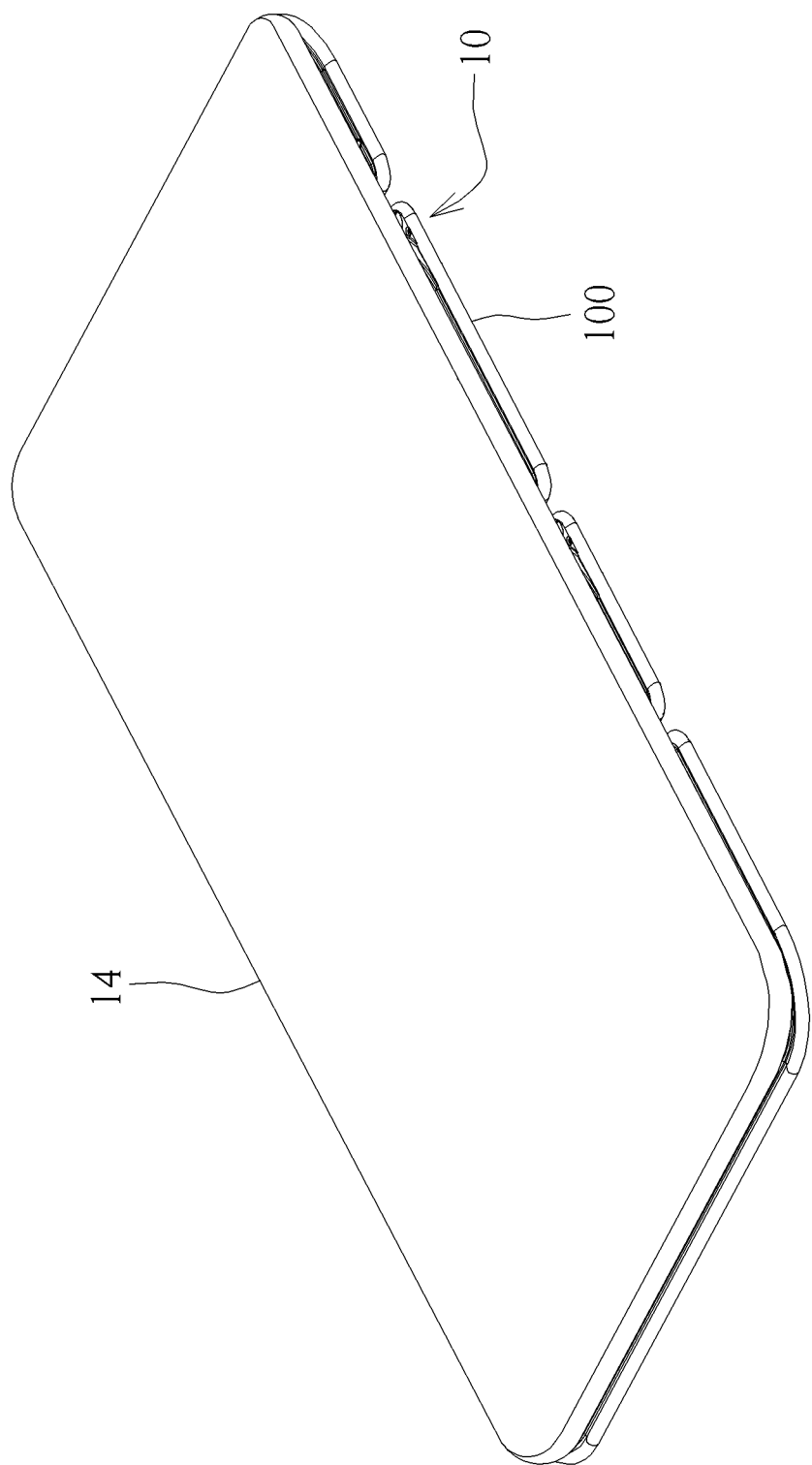
FIG. 2 is an inner view illustrating the cushion shown in FIG. 1.
Figure 3:
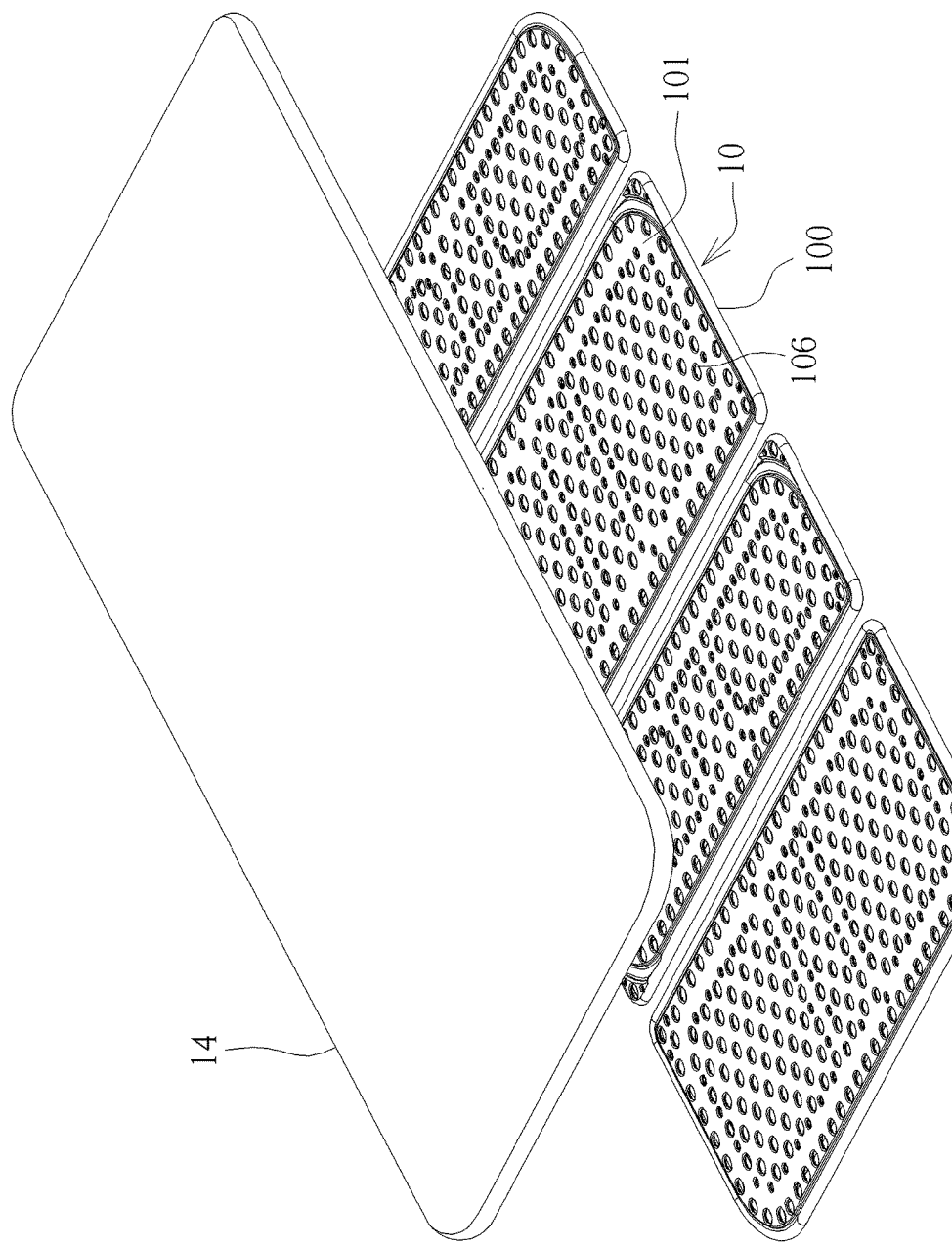
FIG. 3 is an exploded view illustrating the reinforcing plates and the permeable layer shown in FIG. 2.

Referring to FIGS. 1 to 3, FIG. 1 is a perspective view illustrating a cushion 1 according to a first embodiment of the invention, FIG. 2 is an inner view illustrating the cushion 1 shown in FIG. 1, and FIG. 3 is an exploded view illustrating the reinforcing plates 10 and the permeable layer 14 shown in FIG. 2.

As shown in FIGS. 1 to 3, the cushion 1 comprises a plurality of reinforcing plates 10, a fabric cover 12 and a permeable layer 14, wherein the reinforcing plates 10 and the permeable layer 14 are disposed in the fabric cover 12, and the permeable layer 14 is located on top surfaces 101 of the reinforcing plates 10. In this embodiment, the reinforcing plate 10 may be made of metal or plastic, the fabric cover 12 may be a permeable mesh fabric or other fabrics, and the permeable layer 14 may be a permeable cotton, a permeable polymer or other permeable materials. Furthermore, the permeable layer 14 is elastic. Accordingly, when a baby lies on the cushion 1, the permeable layer 14 can support the baby elastically, so as to prevent the baby from contacting with the reinforcing plate 10 directly and feeling uncomfortable.

In this embodiment, the reinforcing plates 10 are arranged side by side and separated from each other. Accordingly, the fabric cover 12 may have a plurality of stitched lines 120, and each of the stitched lines 120 may separate two adjacent reinforcing plates 10 from each other. Since the permeable layer 14 is located on the top surfaces 101 of the reinforcing plates 10, the stitched lines 120 may stitch the fabric cover 12 with the permeable layer 14 together. In this embodiment, a zipper 12a or other open/close components may be disposed on a side of the fabric cover 12, such that a user may take the reinforcing plates 10 out of the fabric cover 12 or put the reinforcing plates 10 into the fabric cover 12. Furthermore, the user may selectively fold or expand the cushion 1 through the stitched lines 120, so as to store or transport the cushion 1.

Figure 4:
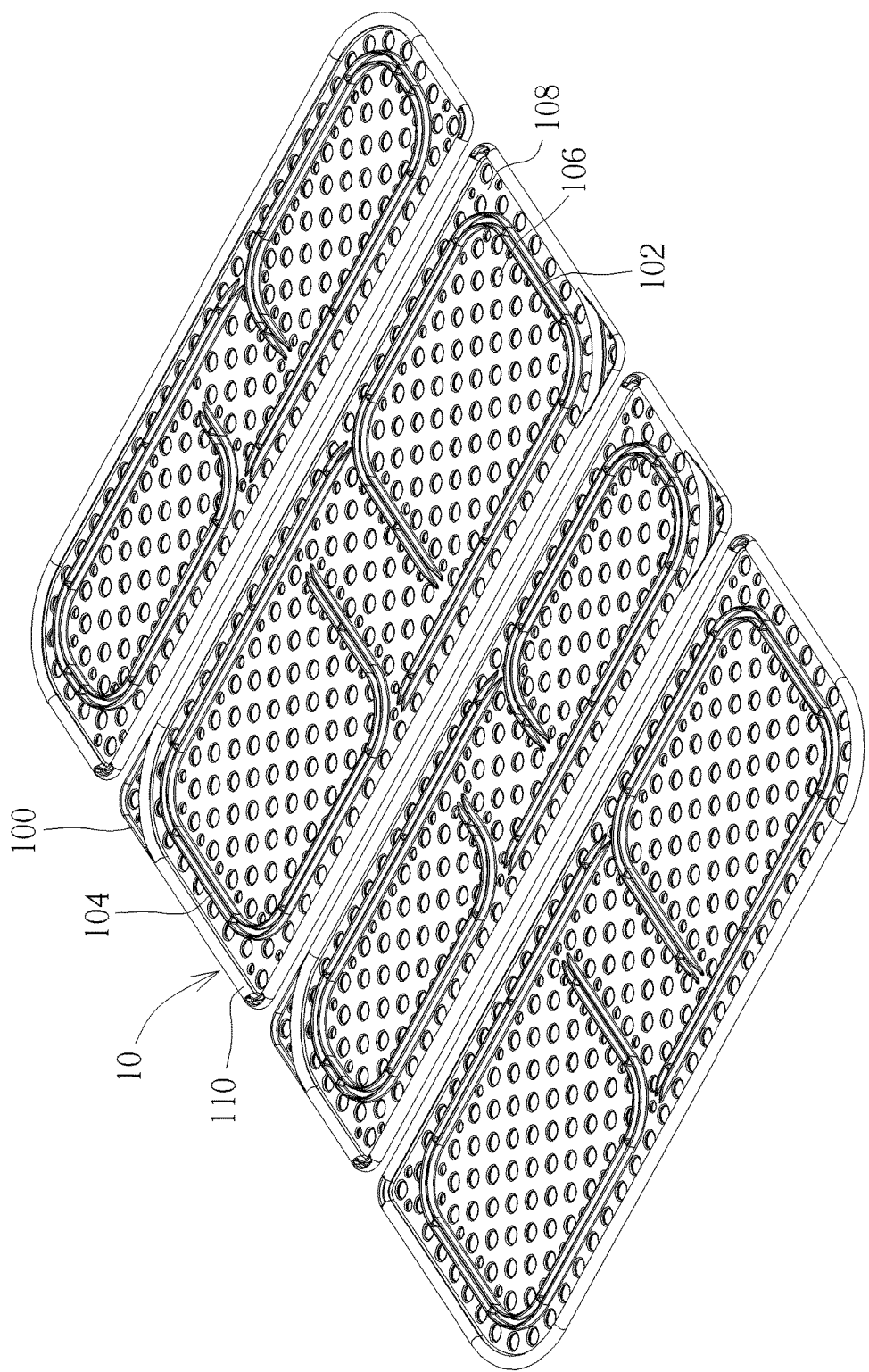
FIG. 4 is a rear perspective view illustrating the reinforcing plates shown in FIG. 3.
Figure 5:
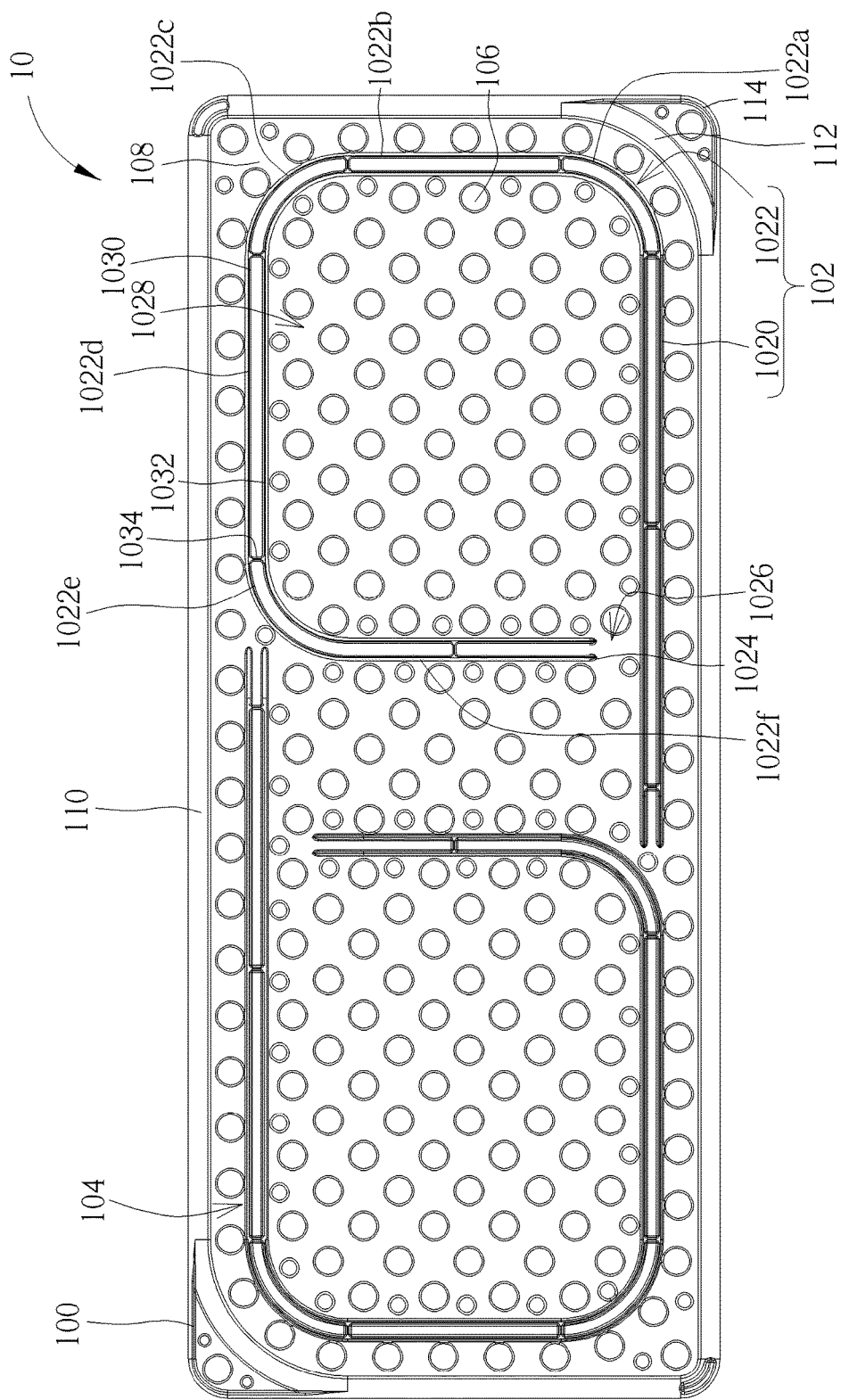
FIG. 5 is a top view illustrating one reinforcing plate shown in FIG. 4.

Referring to FIGS. 4 and 5, FIG. 4 is a rear perspective view illustrating the reinforcing plates 10 shown in FIG. 3 and FIG. 5 is a top view illustrating one reinforcing plate 10 shown in FIG. 4. As shown in FIG. 4, each of the reinforcing plates 10 comprises a plate body 100, a first reinforcing rib 102 and a second reinforcing rib 104. The plate body 100 has a plurality of through holes 106 formed thereon. The first reinforcing rib 102 and the second reinforcing rib 104 are located at a bottom surface 108 of the plate body 100. In this embodiment, the first reinforcing rib 102 and the second reinforcing rib 104 are located at the bottom surface 108 of the plate body 100 symmetrically, and the first reinforcing rib 102 and the second reinforcing rib 104 are separated from each other. Furthermore, a structure of the second reinforcing rib 104 is identical to a structure of the first reinforcing rib 102. Therefore, the first reinforcing rib 102 is used to depict the features of the invention in the following.

As shown in FIG. 5, the first reinforcing rib 102 comprises a straight section 1020 and a curved section 1022, wherein the curved section 1022 extends from the straight section 1020 and a gap 1026 exists between an end 1024 of the curved section 1022 and the straight section 1020. In this embodiment, the curved section 1022 may comprise a first curved portion 1022a, a first straight portion 1022b, a second curved portion 1022c, a second straight portion 1022d, a third curved portion 1022e and a third straight portion 1022f, wherein the first curved portion 1022a extends from the straight section 1020, the first straight portion 1022b extends from the first curved portion 1022a, the second curved portion 1022c extends from the first straight portion 1022b, the second straight portion 1022d extends from the second curved portion 1022c, the third curved portion 1022e extends from the second straight portion 1022d, and the third straight portion 1022f extends from the third curved portion 1022e. Furthermore, the third straight portion 1022f provides the aforesaid end 1024 of the curved section 1022. In this embodiment, the second straight portion 1022d is substantially parallel to the straight section 1020, and the first straight portion 1022b and the third straight portion 1022f are substantially perpendicular to the straight section 1020. It should be noted that the second straight portion 1022d is not limited to be parallel to the straight section 1020, and the first straight portion 1022b and the third straight portion 1022f are not limited to be perpendicular to the straight section 1020. If the straight section and straight portions are connected to each other directly without the curved portions, stress concentration may occur when the reinforcing rib is forced by an external force, such that the reinforcing plate will break or be damaged easily. In other words, due to the configuration of the curved portions, the reinforcing plate will not break or be damaged easily. Accordingly, if it needs to increase the length of the reinforcing rib on a limited area of the reinforcing plate, it has to increase the number of curved portions correspondingly, so as to reinforce the strength of the reinforcing rib.

In this embodiment, the first reinforcing rib 102 may essentially consist of a first side wall 1030, a second side wall 1032 and a plurality of connecting portions 1034. As shown in FIG. 5, the first side wall 1030 and the second side wall 1032 are arranged side by side and separated from each other by a specific distance. The connecting portions 1034 are located between the first side wall 1030 and the second side wall 1032 and connect the first side wall 1030 and the second side wall 1032. In this embodiment, a thickness of the connecting portion 1034 is substantially identical to a thickness of the first side wall 1030 and the second side wall 1032, and the connecting portion 1034 is substantially perpendicular to the first side wall 1030 and the second side wall 1032. Accordingly, the structural strength of the thin-wall structure of the first reinforcing rib 102 may be similar to the structural strength of a solid structure. Consequently, the material of the first reinforcing rib 102 can be saved and the structural strength of the first reinforcing rib 102 can be kept good.

Since the gap 1026 exists between the end 1024 of the curved section 1022 and the straight section 1020 of the first reinforcing rib 102 (i.e. the end 1024 of the curved section 1022 is not connected to the straight section 1020 of the first reinforcing rib 102), stress concentration will not occur when the reinforcing rib 102 is forced by an external force, such that the reinforcing plate 10 will not break or be damaged easily.

Furthermore, each of the reinforcing plates 10 may further comprise a reinforcing structure 110 and the reinforcing structure 110 surrounds a periphery of the reinforcing plate 10. In this embodiment, the reinforcing structure 110 may be a hollow structure. For example, the invention may utilize a gas assisted injection molding process to form the hollow structure of the reinforcing structure 110, so as to save the material of the reinforcing structure 110. The reinforcing structure 110 can further reinforce the structural strength of the reinforcing plate 10. Moreover, at least one corner 112 of the reinforcing structure 110 and at least one corner 114 of the reinforcing plate 10 may be separated from each other. In other words, a curvature of the corner 112 is different from a curvature of the corner 114. Accordingly, it can generate space to improve yield rate of the gas assisted injection molding process. However, the invention is not limited to the aforesaid manner.

As shown in FIG. 5, the first reinforcing rib 102 is substantially P-shaped, such that a non-closed space 1028 is formed between a part of the straight section 1020 and the curved section 1022. At least two of the through holes 106 are located in the non-closed space 1028. Since some through holes 106 are located in the non-closed space 1028 formed by the first reinforcing rib 102, the through holes 106 in the non-closed space 1028 can improve ventilation when the baby lies on the cushion 1, so as to reduce suffocation risk while the mouth or nose of the baby are covered by the cushion 1. Furthermore, the through holes 106 may have at least two different sizes to increase arrangement density of the through holes 106, so as to improve ventilation. Preferably, the through holes 106 with different sizes may be arranged interlacedly.

Figure 6:
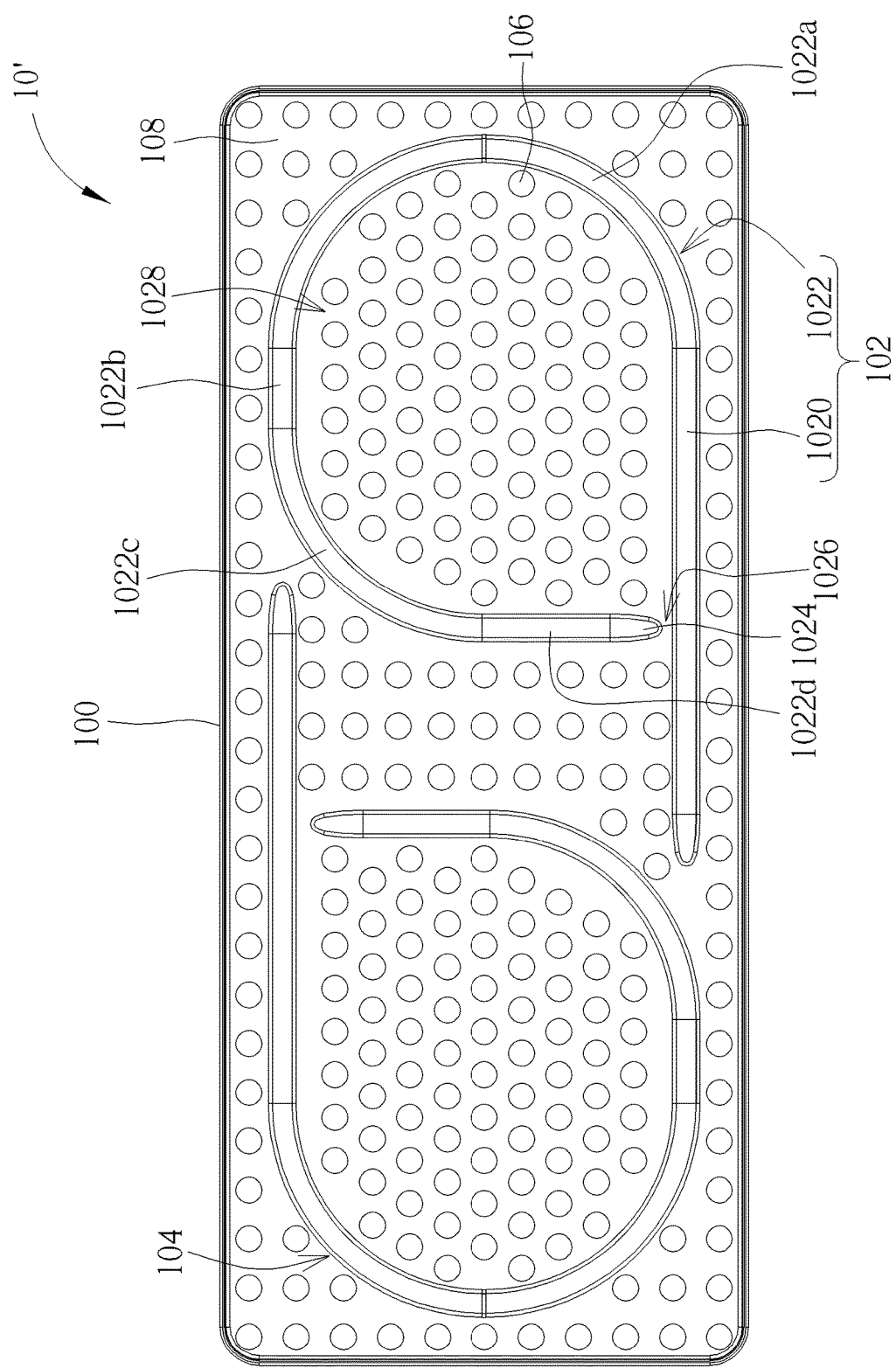
FIG. 6 is a top view illustrating a reinforcing plate according to a second embodiment of the invention.

Referring to FIG. 6, FIG. 6 is a top view illustrating a reinforcing plate 10' according to a second embodiment of the invention. The main difference between the reinforcing plate 10' and the aforesaid reinforcing plate 10 is that the first reinforcing rib 102 and the second reinforcing rib 104 of the reinforcing plate 10' are hollow structures formed by the gas assisted injection molding process, as shown in FIG. 6. However, the invention is not limited to the aforesaid manner. In other words, the invention may design the first reinforcing rib 102 and the second reinforcing rib 104 as solid or hollow according to practical applications.

Figure 7:
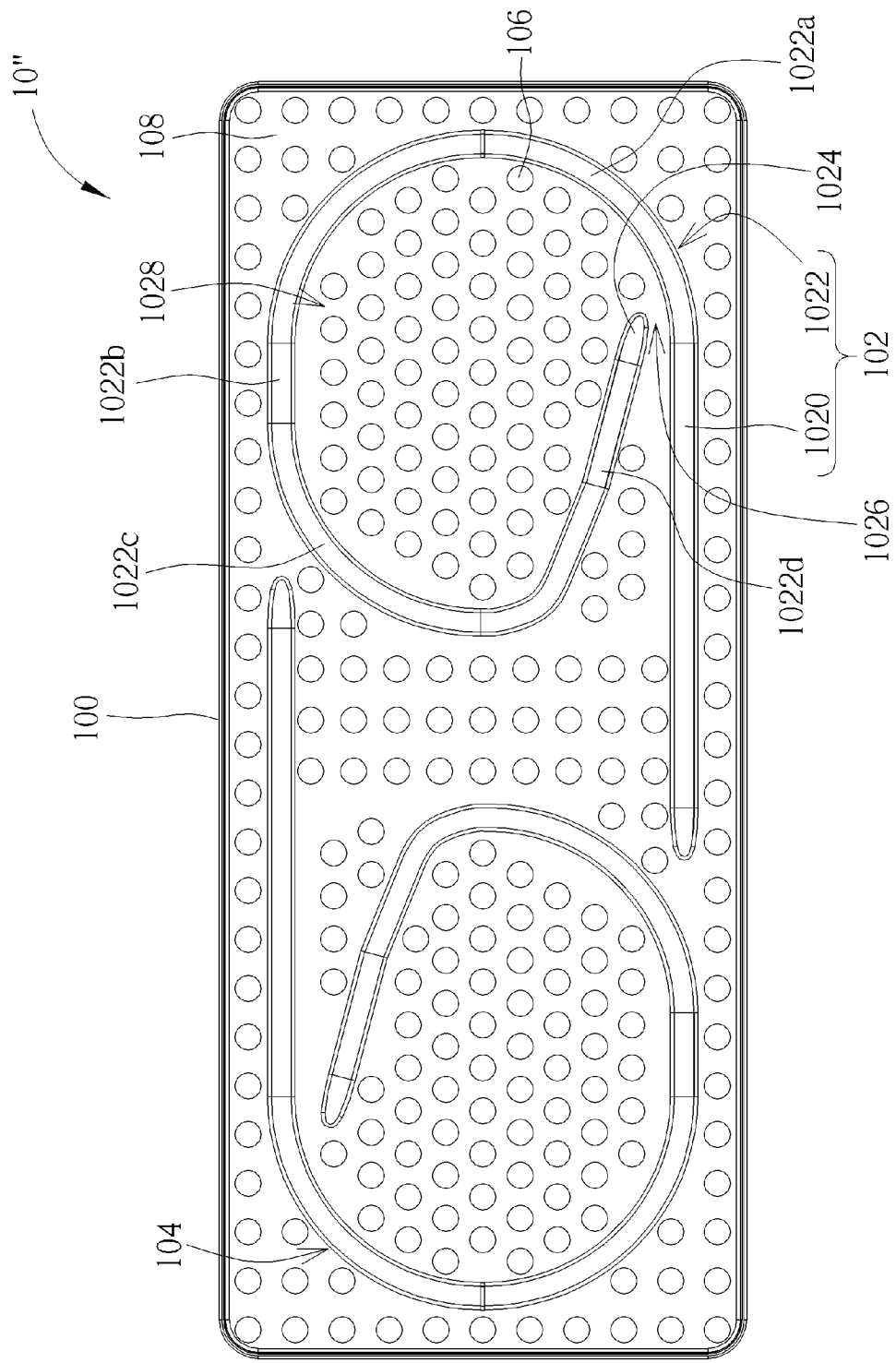
FIG. 7 is a top view illustrating a reinforcing plate according to a third embodiment of the invention.

Referring to FIG. 7, FIG. 7 is a top view illustrating a reinforcing plate 10" according to a third embodiment of the invention. The main difference between the reinforcing plate 10" and the aforesaid reinforcing plate 10' is that the gap 1026 exists between the end 1024 of the curved section 1022 and the curved section 1022 itself of the reinforcing plate 10", as shown in FIG. 7. Since the gap 1026 exists between the end 1024 of the curved section 1022 and the curved section 1022 itself of the first reinforcing rib 102 (i.e. the end 1024 of the curved section 1022 is not connected to the curved section 1022 of the first reinforcing rib 102), stress concentration will not occur when the reinforcing rib 102 is forced by an external force, such that the reinforcing plate 10 will not break or be damaged easily.

According to the embodiments shown in FIGS. 6 and 7, the gap 1026 may selectively exist between the end 1024 of the curved section 1022 and one of the straight section 1020 and the curved section 1022 according to practical applications.

Figure 8:
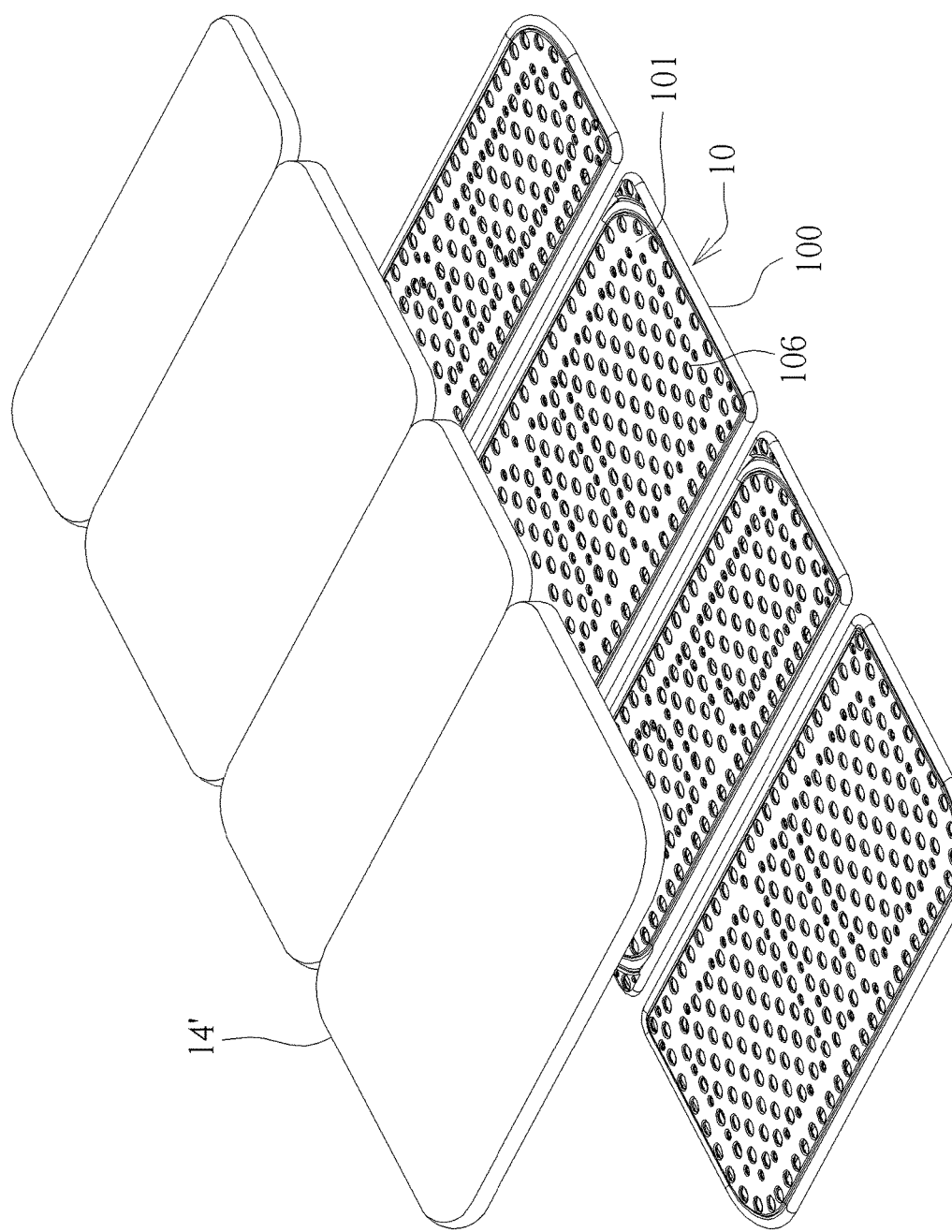
FIG. 8 is an exploded view illustrating the reinforcing plate and a permeable layer according to a fourth embodiment of the invention.

Referring to FIG. 8, FIG. 8 is an exploded view illustrating the reinforcing plate 10 and a permeable layer 14' according to a fourth embodiment of the invention. The main difference between the embodiments shown in FIGS. 8 and 3 is that the embodiment shown in FIG. 8 comprises a plurality of individual permeable layers 14'. The permeable layers 14' may be disposed in the aforesaid fabric cover 12 and each of the permeable layers 14' may be located on the top surface 101 of one of the reinforcing plates 10. In this embodiment, the stitched lines 120 may stitch or not stitch the fabric cover 12 with the permeable layers 14' together according to practical applications.

According to the embodiments shown in FIGS. 3 and 8, the permeable layer of the invention may be designed as one single permeable layer 14 or a plurality of permeable layers 14' according to practical applications.

Figure 9:
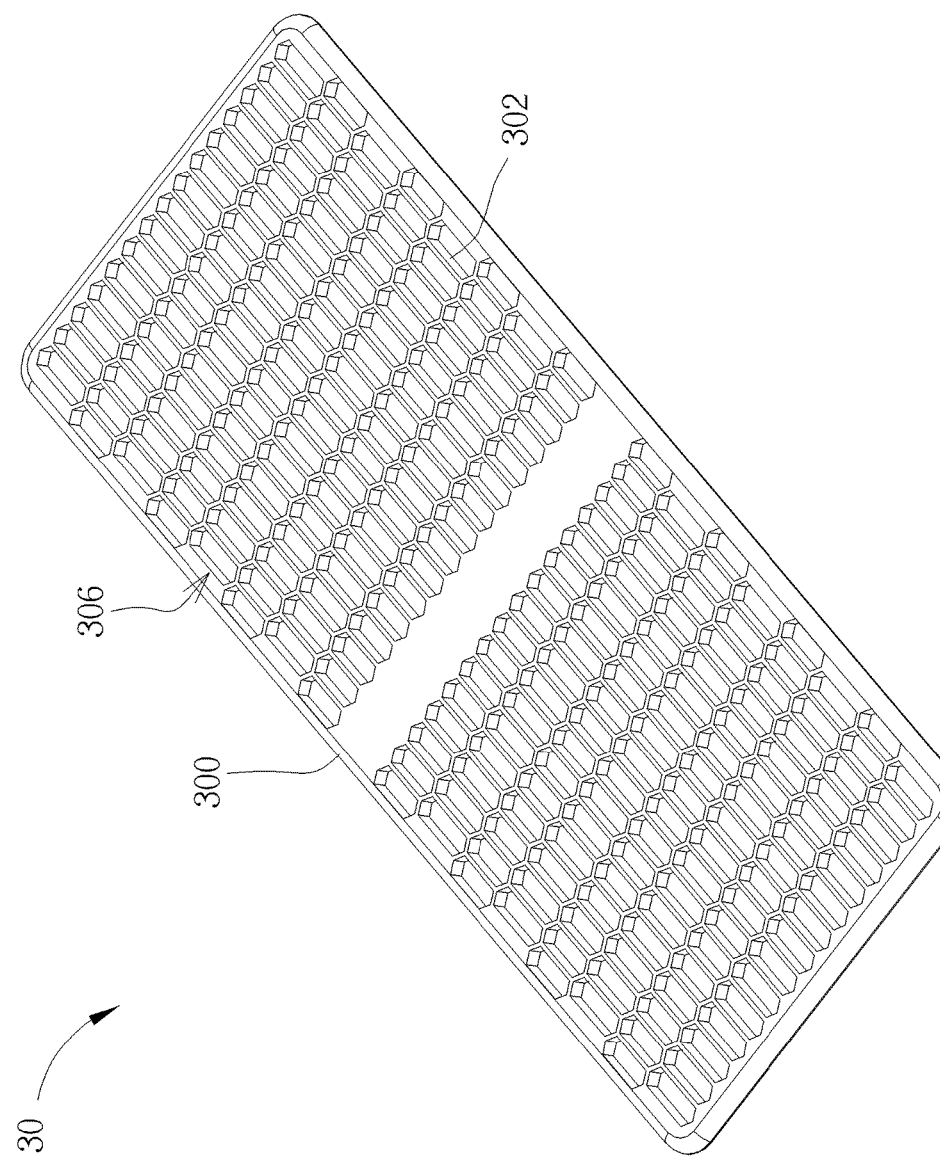
FIG. 9 is a front perspective view illustrating a reinforcing plate according to a fifth embodiment of the invention.
Figure 10:
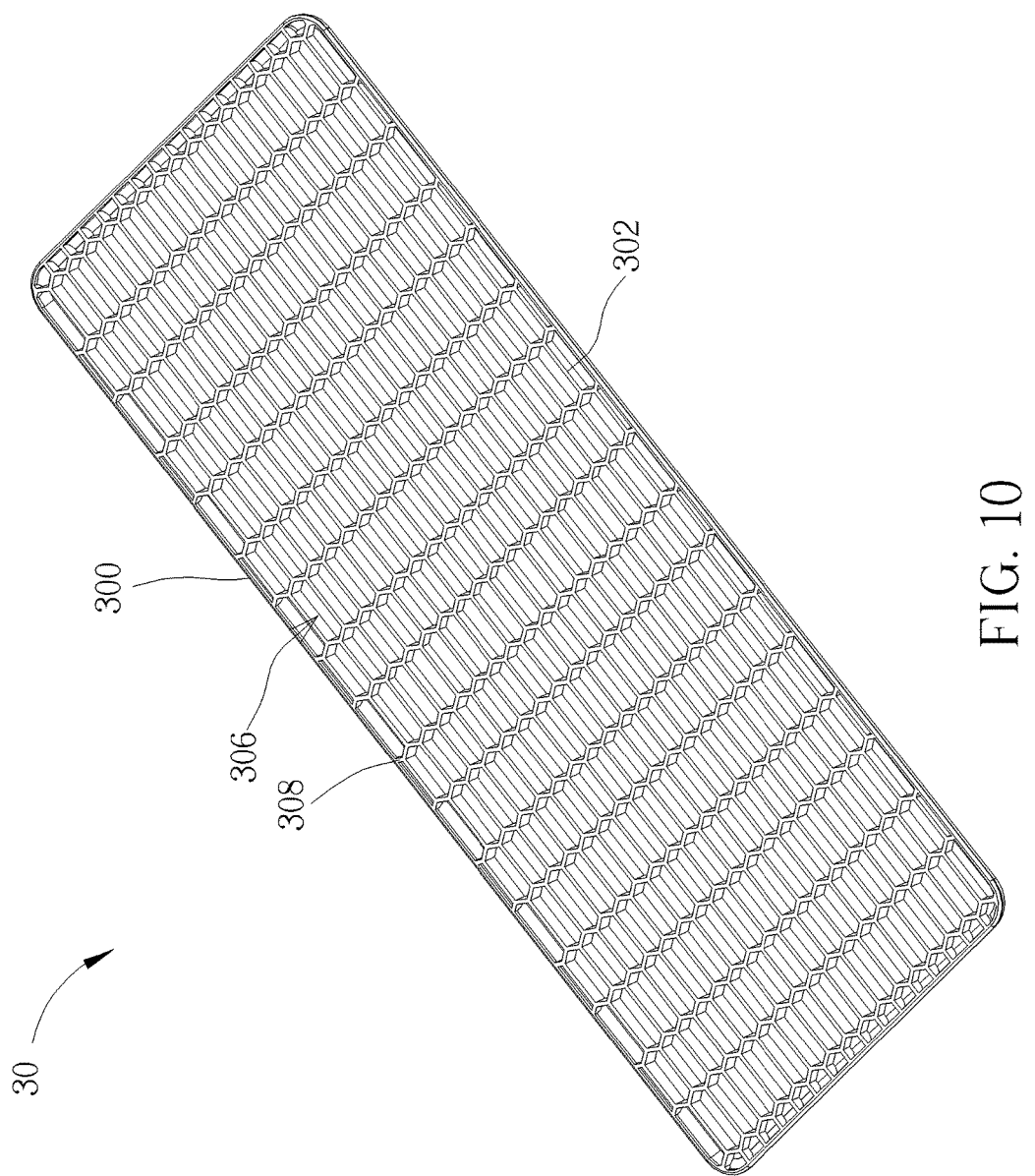
FIG. 10 is a rear perspective view illustrating the reinforcing plate shown in FIG. 9.

Referring to FIGS. 9 and 10, FIG. 9 is a front perspective view illustrating a reinforcing plate 30 according to a fifth embodiment of the invention and FIG. 10 is a rear perspective view illustrating the reinforcing plate 30 shown in FIG. 9. As shown in FIGS. 9 and 10, the reinforcing plate 30 comprises a plate body 300 and a reinforcing rib 302. The plate body 300 has a plurality of through holes 306 formed thereon. The reinforcing rib 302 is located at a bottom surface 308 of the plate body 300. In this embodiment, the reinforcing rib 302 is formed on edges of the through holes 306 directly, so the shape and size of the reinforcing rib 302 are corresponding to the through holes 306. The invention may replace the aforesaid reinforcing plate 10 of the cushion 1 by the reinforcing plate 30. Since the through holes 306 are distributed as beehive-shaped, it can improve ventilation of the reinforcing plate 30 effectively. Furthermore, since the reinforcing rib is also distributed as beehive-shaped, it can reinforce structural strength of the reinforcing plate 30 effectively.

Figure 11:
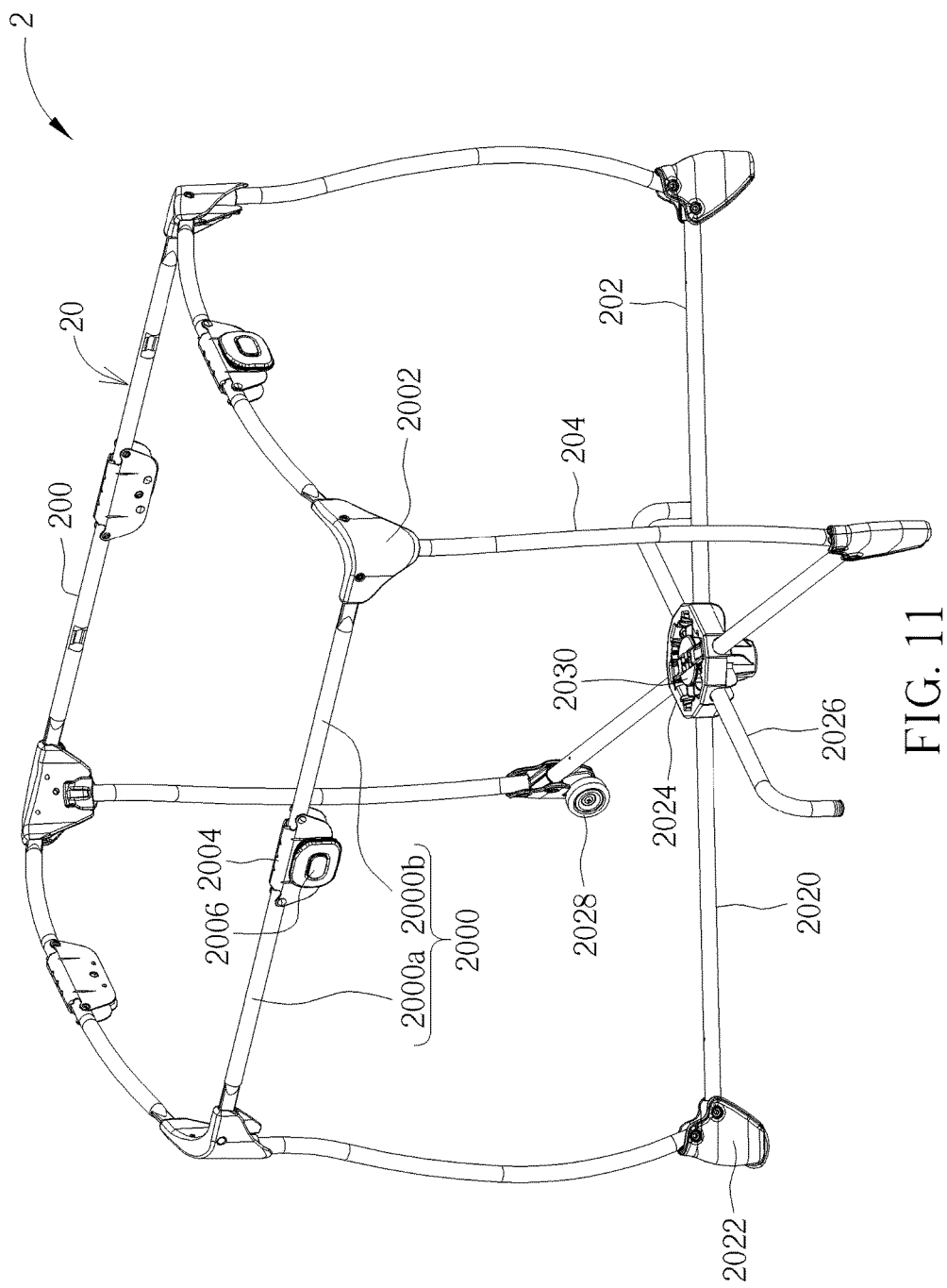
FIG. 11 is a perspective view illustrating a baby carriage according to a sixth embodiment of the invention.

Referring to FIG. 11, FIG. 11 is a perspective view illustrating a baby carriage 2 according to a sixth embodiment of the invention. As shown in FIG. 11, the baby carriage 2 comprises a frame 20. In this embodiment, the baby carriage 2 may be a crib. Furthermore, the baby carriage 2 further comprises the aforesaid cushion. Since the features of the cushion have been depicted in detail in the above, only the features of the frame 20 are depicted in the following.

As shown in FIG. 11, the frame 20 comprises an upper support frame 200, a lower support frame 202 and a plurality of upright posts 204, wherein opposite ends of each upright post 204 are connected to the upper support frame 200 and the lower support frame 202. In this embodiment, the upper support frame 200 may comprise a plurality of upper support members 2000 and a plurality of upper corners 2002, wherein the upper support members 2000 and the upper corners 2002 are connected to each other, so as to form a closed space. Furthermore, the lower support frame 202 may comprise a plurality of lower support members 2020, a plurality of lower corners 2022 and a base 2024, wherein opposite ends of each lower support member 2020 are connected to the lower corner 2022 and the base 2024. An end of each upright post 204 may be connected to the upper corner 2002 correspondingly and another end of each upright post 204 may be connected to the lower corner 2022 correspondingly.

In this embodiment, the lower support frame 202 may further comprise a plurality of support feet 2026 and a plurality of wheels 2028. An end of each support foot 2026 is connected to the base 2024 and another end of each support foot 2026 is curved in a direction away from the upper support frame 200. Each of the wheels 2028 is pivotally connected to the lower corner 2022 correspondingly. Accordingly, the frame 20 can move on a support plane by the wheels 2028. When the frame 20 moves to a specific position, the support feet 2026 can assist in supporting the frame 20 on the support plane.

In this embodiment, the upper support frame 200 may further comprise a plurality of lock mechanisms 2004, wherein the lock mechanism 2004 is disposed on the upper support member 2000. Each of the upper support members 2000 may comprise two handrail tubes 2000a, 2000b, wherein opposite ends of each handrail tube 2000a, 2000b are pivotally connected to the upper corner 2002 and the lock mechanism 2004 correspondingly. Furthermore, the lock mechanism 2004 may have a button 2006. When the two handrail tubes 2000a, 2000b are expanded with respect to each other, the lock mechanism 2004 locks the two handrail tubes 2000a, 2000b, such that the two handrail tubes 2000a, 2000b can be kept at the expanded state shown in FIG. 11. When the button 2006 of the lock mechanism 2004 is pressed, the lock mechanism 2004 releases the two handrail tubes 2000a, 2000b, such that the two handrail tubes 2000a, 2000b are capable of rotating with respect to each other, so as to be folded with respect to each other.

In this embodiment, opposite ends of each lower support member 2020 may be pivotally connected to the lower corner 2022 and the base 2024 correspondingly. Furthermore, the base 2024 may comprise an engaging mechanism 2030. When the lower support member 2020 is expanded with respect to the lower corner 2022 and the base 2024, the engaging mechanism 2030 engages with and fixes the lower support member 2020, such that the lower support member 2020 is kept at the expanded state shown in FIG. 11. When the engaging mechanism 2030 releases the lower support member 2020, the lower support member 2020 is capable of rotating with respect to the lower corner 2022 and the base 2024, so as to be folded with respect to the lower corner 2022 and the base 2024.

Therefore, when a user wants to store or transport the frame 20, the user can press the button 2006 of the lock mechanism 2004 to release the handrail tubes 2000a, 2000b and operate the engaging mechanism 2030 to release the lower support member 2020. At this time, the user can rotate and fold the handrail tubes 2000a, 2000b with respect to each other and rotate and fold the lower support member 2020 with respect to the lower corner 2022 and the base 2024, so as to reduce the volume of the frame 20. Consequently, the frame 20 can be stored or transported conveniently.

In this embodiment, the invention may dispose a support fabric (not shown) in the frame 20 first and then dispose the aforesaid cushion on the support fabric, so as to dispose the cushion on the frame 20. It should be noted that the reinforcing plates disposed in the cushion may be formed as one single reinforcing plate, so the invention is not limited to a plurality of reinforcing plates. In other words, the invention may change the size of the reinforcing plate according to practical applications, so as to enable the size of one single reinforcing plate to match the size of the frame 20.

Figure 12:
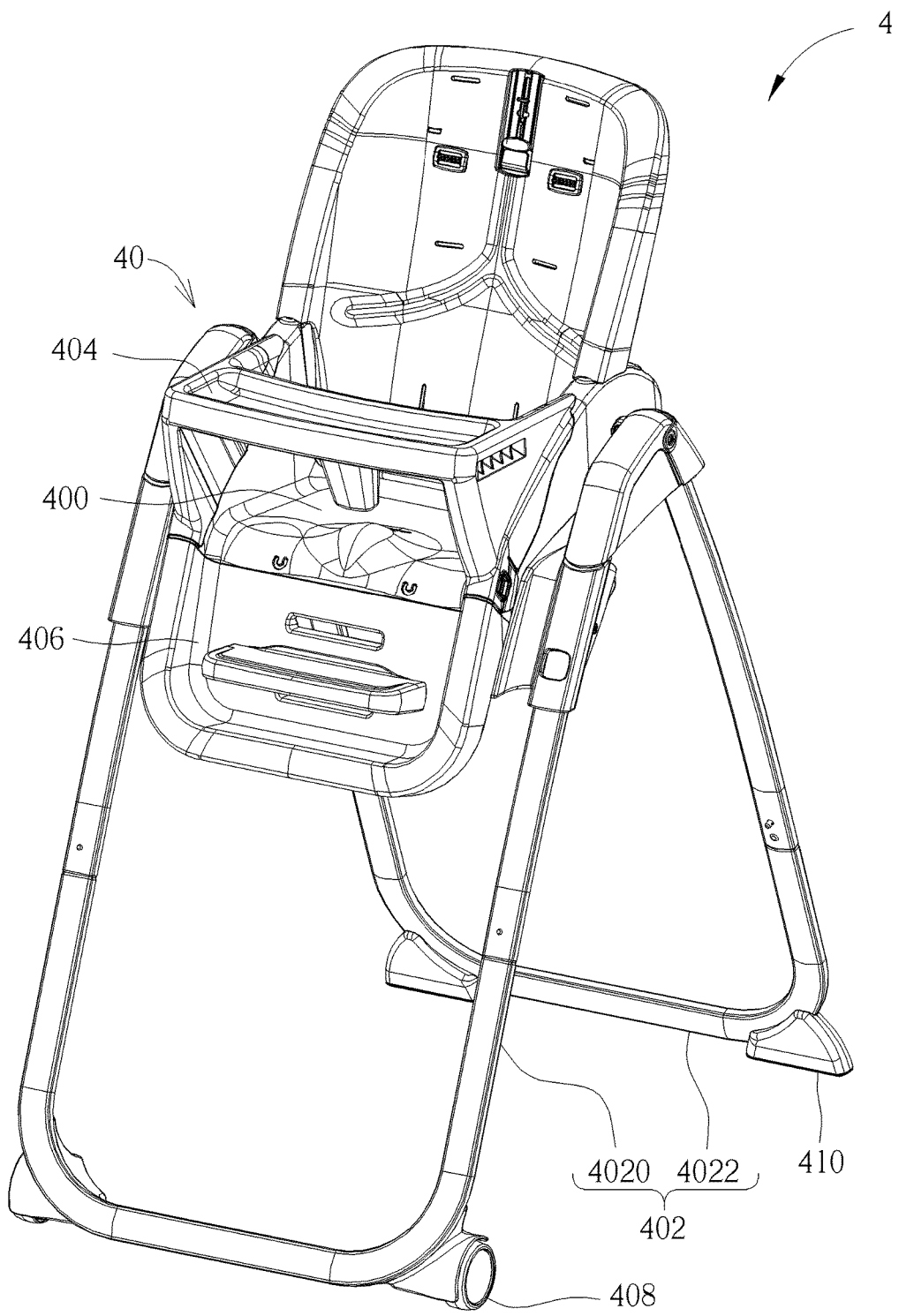
FIG. 12 is a front perspective view illustrating a baby carriage according to a seventh embodiment of the invention.
Figure 13:
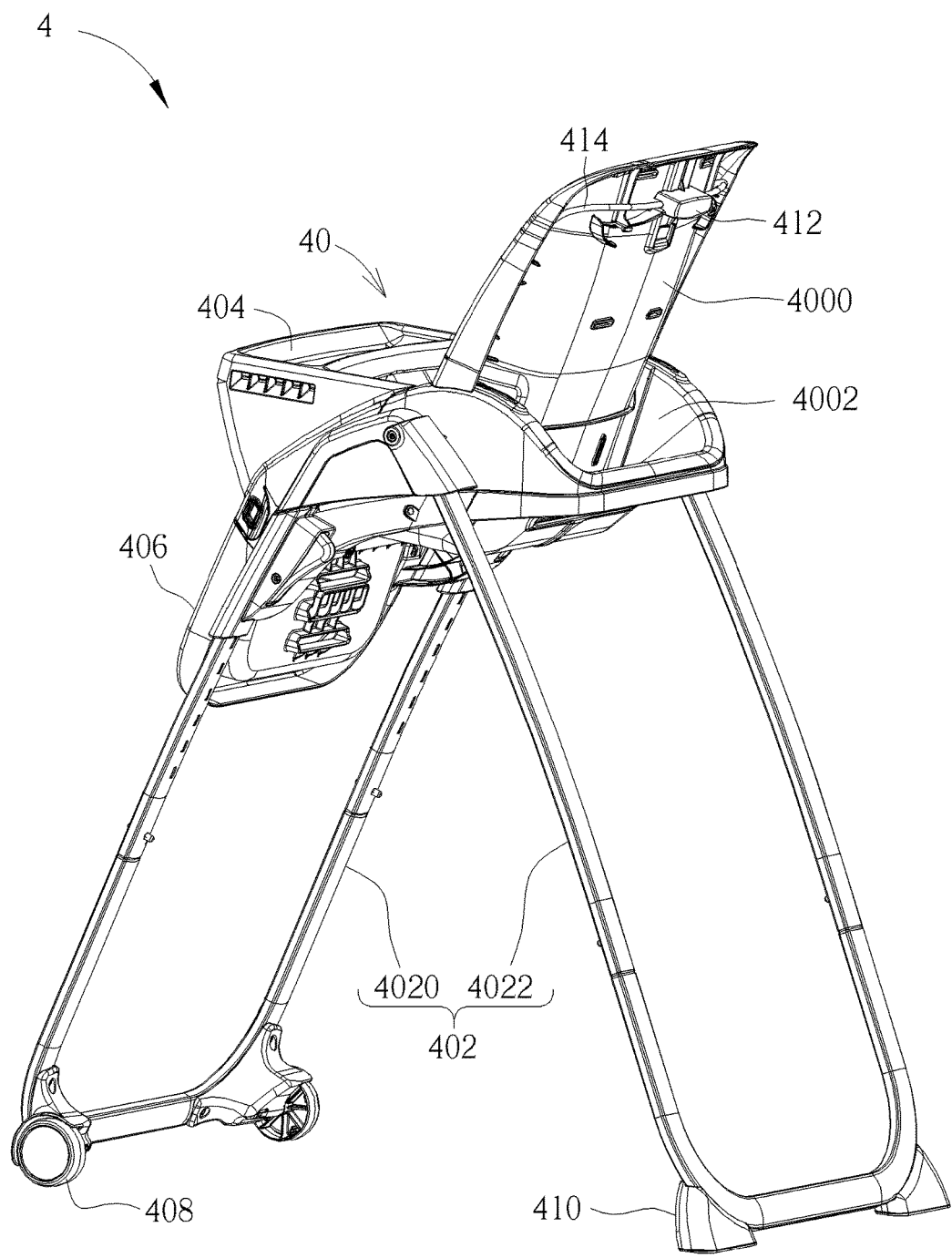
FIG. 13 is a rear perspective view illustrating the baby carriage shown in FIG. 12.

Referring to FIGS. 12 and 13, FIG. 12 is a front perspective view illustrating a baby carriage 4 according to a seventh embodiment of the invention and FIG. 13 is a rear perspective view illustrating the baby carriage 4 shown in FIG. 12. As shown in FIGS. 12 and 13, the baby carriage 4 comprises a frame 40. In this embodiment, the baby carriage 4 may be a high chair. Furthermore, the baby carriage 4 further comprises the aforesaid cushion. Since the features of the cushion have been depicted in detail in the above, only the features of the frame 40 are depicted in the following.

As shown in FIG. 12, the frame 40 comprises a seat 400, a support frame 402, a tray 404, a leg rest 406, at least one wheel 408 and at least one skidproof member 410. The seat 400 is disposed on the support frame 402. The tray 404 is disposed on the seat 400. The leg rest 406 is connected to a bottom of the seat 400. In this embodiment, the support frame 402 may comprise a front leg frame 4020 and a rear leg frame 4022, wherein the front leg frame 4020 and the rear leg frame 4022 are pivotally connected to each other, such that the front leg frame 4020 and the rear leg frame 4022 are capable of being expanded or folded with respect to each other. The wheels 408 are pivotally connected to the front leg frame 4020. The skidproof members 410 are connected to the rear leg frame 4022. Accordingly, the frame 40 can move on a support plane by the wheels 408. When the frame 40 moves to a specific position, the skidproof members 410 can prevent the frame 40 from moving on the support plane.

As shown in FIG. 13, the frame 40 may further comprise an operating member 412, a connecting member 414 and an engaging member (not shown), wherein the operating member 412, the connecting member 414 and the engaging member are disposed on a backrest 4000 of the seat 400. Opposite ends of the connecting member 414 are connected to the operating member 412 and the engaging member. Furthermore, a side plate 4002 of the seat 400 has a plurality of engaging holes (not shown) formed thereon. When the engaging member is engaged with one of the engaging holes, the backrest 4000 of the seat 400 is kept at an inclined angle, as shown in FIG. 13. When the user wants to adjust the inclined angle of the backrest 4000, the user can pull the operating member 412 upwardly. When the operating member 412 is operated to pull the connecting member 414, the engaging member is disengaged from the engaging hole, such that the backrest 4000 is capable of moving with respect to the side plate 4002, so as to adjust the inclined angle of the backrest 4000.

In this embodiment, the invention may dispose the aforesaid cushion on the seat 400 of the frame 40. It should be noted that the reinforcing plates disposed in the cushion may be formed as one single reinforcing plate, so the invention is not limited to a plurality of reinforcing plates. In other words, the invention may change the size of the reinforcing plate according to practical applications, so as to enable the size of one single reinforcing plate to match the size of the seat 400 of the frame 40.

Figure 14:
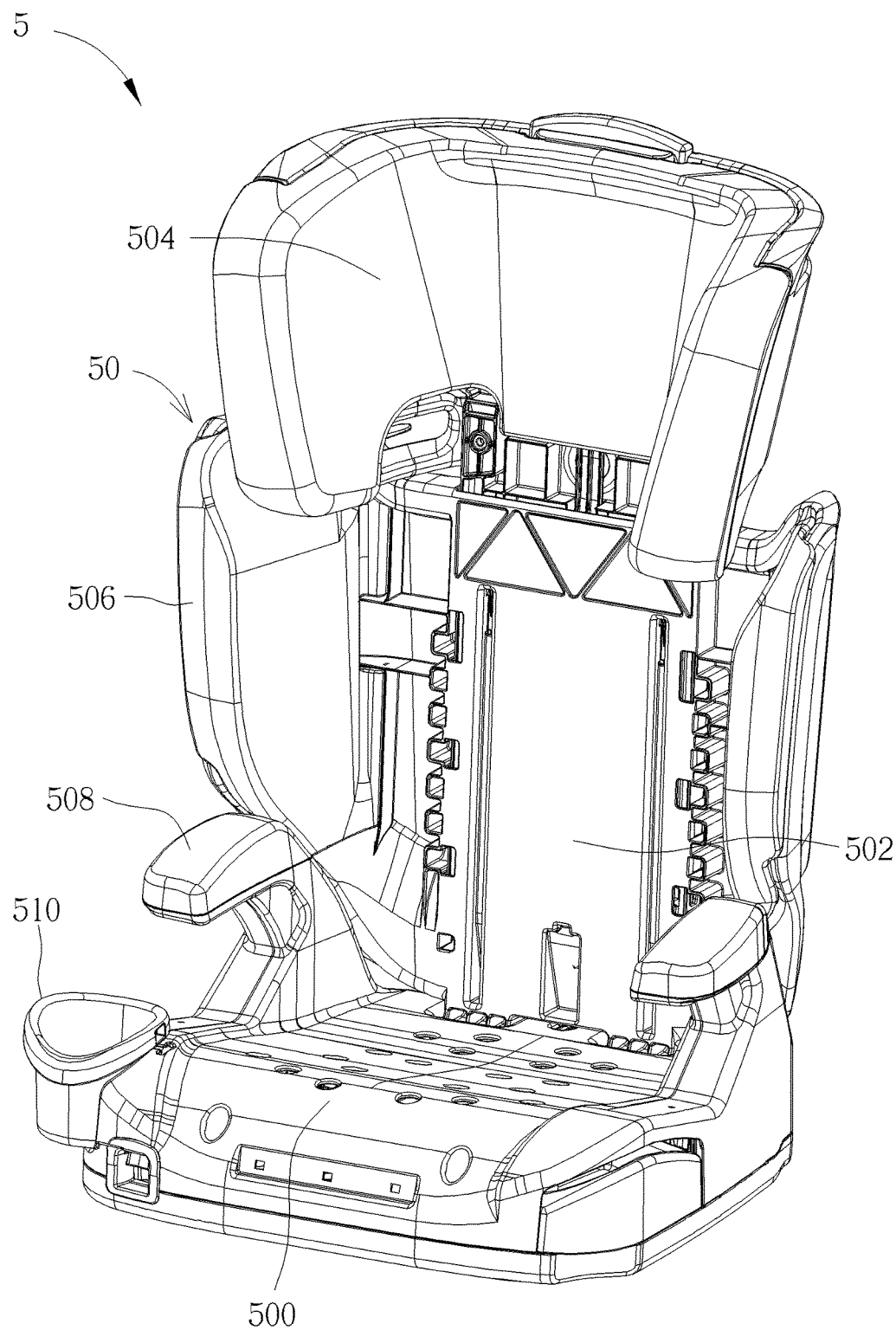
FIG. 14 is a perspective view illustrating a baby carriage according to an eighth embodiment of the invention.

Referring to FIG. 14, FIG. 14 is a perspective view illustrating a baby carriage 5 according to an eighth embodiment of the invention. As shown in FIG. 14, the baby carriage 5 comprises a frame 50. In this embodiment, the baby carriage 5 may be a car seat. Furthermore, the baby carriage 5 further comprises the aforesaid cushion. Since the features of the cushion have been depicted in detail in the above, only the features of the frame 50 are depicted in the following.

As shown in FIG. 14, the frame 50 comprises a seat 500, a backrest 502, a headrest 504, two side wings 506, two handrails 508 and a cup holder 510. The backrest 502 is disposed on the seat 500. The headrest 504 is disposed on the backrest 502. The two side wings 506 are disposed on opposite sides of the backrest 502. The two handrails 508 are disposed on opposite sides of the seat 500. The cup holder 510 is disposed on a side of the seat 500.

In this embodiment, the invention may dispose the aforesaid cushion on the seat 500 of the frame 50. It should be noted that the reinforcing plates disposed in the cushion may be formed as one single reinforcing plate, so the invention is not limited to a plurality of reinforcing plates. In other words, the invention may change the size of the reinforcing plate according to practical applications, so as to enable the size of one single reinforcing plate to match the size of the seat 500 of the frame 50.

Figure 15:
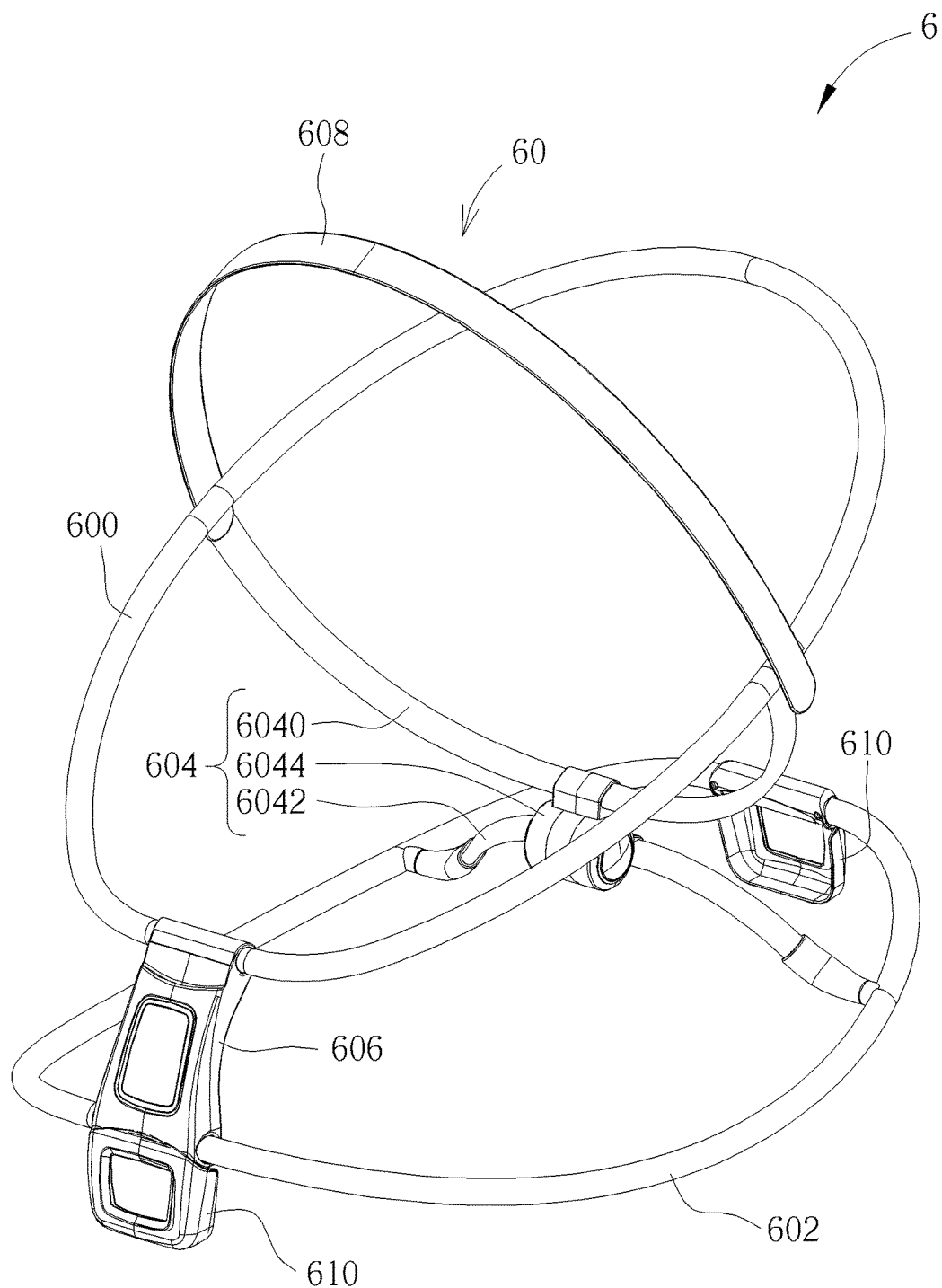
FIG. 15 is a perspective view illustrating a baby carriage according to a ninth embodiment of the invention.

Referring to FIG. 15, FIG. 15 is a perspective view illustrating a baby carriage 6 according to a ninth embodiment of the invention. As shown in FIG. 15, the baby carriage 6 comprises a frame 60. In this embodiment, the baby carriage 6 may be a rocker. Furthermore, the baby carriage 6 further comprises the aforesaid cushion. Since the features of the cushion have been depicted in detail in the above, only the features of the frame 60 are depicted in the following.

As shown in FIG. 15, the frame 60 comprises a seat 600, a curved base 602, a support frame 604 and a support member 606. In this embodiment, the seat 600 may be, but not limited to, ring-shaped. The support frame 604 is connected to middle portions of the seat 600 and the curved base 602. The support member 606 is pivotally connected to front portions of the seat 600 and the curved base 602. In this embodiment, the support frame 604 may comprise an upper support frame 6040, a lower support frame 6042 and a lock mechanism 6044. The upper support frame 6040 is connected to the seat 600 and the lower support frame 6042 is connected to the curved base 602. The upper support frame 6040 and the lower support frame 6042 may be, but not limited to, U-shaped. The lock mechanism 6044 is connected to the upper support frame 6040 and the lower support frame 6042. When the upper support frame 6040 and the lower support frame 6042 are expanded with respect to each other, the lock mechanism 6044 locks the upper support frame 6040 and the lower support frame 6042, such that the upper support frame 6040 and the lower support frame 6042 are kept at the expanded state shown in FIG. 15. When the lock mechanism 6044 releases the upper support frame 6040 and the lower support frame 6042, the upper support frame 6040 and the lower support frame 6042 are capable of driving the seat 600 and the curved base 602 to be folded with respect to teach other.

In this embodiment, the frame 60 may further comprise a toy bar 608, wherein the toy bar 608 may be disposed on the seat 600 and used for hanging a toy. Preferably, the toy bar 608 may be pivotally connected to the seat 600.

In this embodiment, the frame 60 may further comprise two brake members 610, wherein the two brake members 610 are pivotally connected to opposite ends of the curved base 602. When the two brake members 610 are expanded with respect to the curved base 602 (as shown in FIG. 15), the two brake members 610 restrains the curved base 602 from rocking with respect to a support plane. On the other hand, when the two brake members 610 are folded with respect to the curved base 602, the curved base 602 is capable of rocking with respect to the support plane.

When the user wants to store or transport the frame 60, the user can operate the lock mechanism 6044 to release the upper support frame 6040 and the lower support frame 6042. At this time, the user can fold the seat 600 and the curved base 602 with respect to each other. Then, the user can rotate and fold the toy bar 608 with respect to the seat 600 and rotate and fold the two brake members 610 with respect to the curved base 602, so as to reduce the volume of the frame 60. Consequently, the frame 60 can be stored or transported conveniently.

In this embodiment, the invention may dispose a support fabric (not shown) in the seat 600 first and then dispose the aforesaid cushion on the support fabric, so as to dispose the cushion on the frame 60. It should be noted that the reinforcing plates disposed in the cushion may be formed as one single reinforcing plate, so the invention is not limited to a plurality of reinforcing plates. In other words, the invention may change the size of the reinforcing plate according to practical applications, so as to enable the size of one single reinforcing plate to match the size of the seat 600 of the frame 60.

Figure 16:
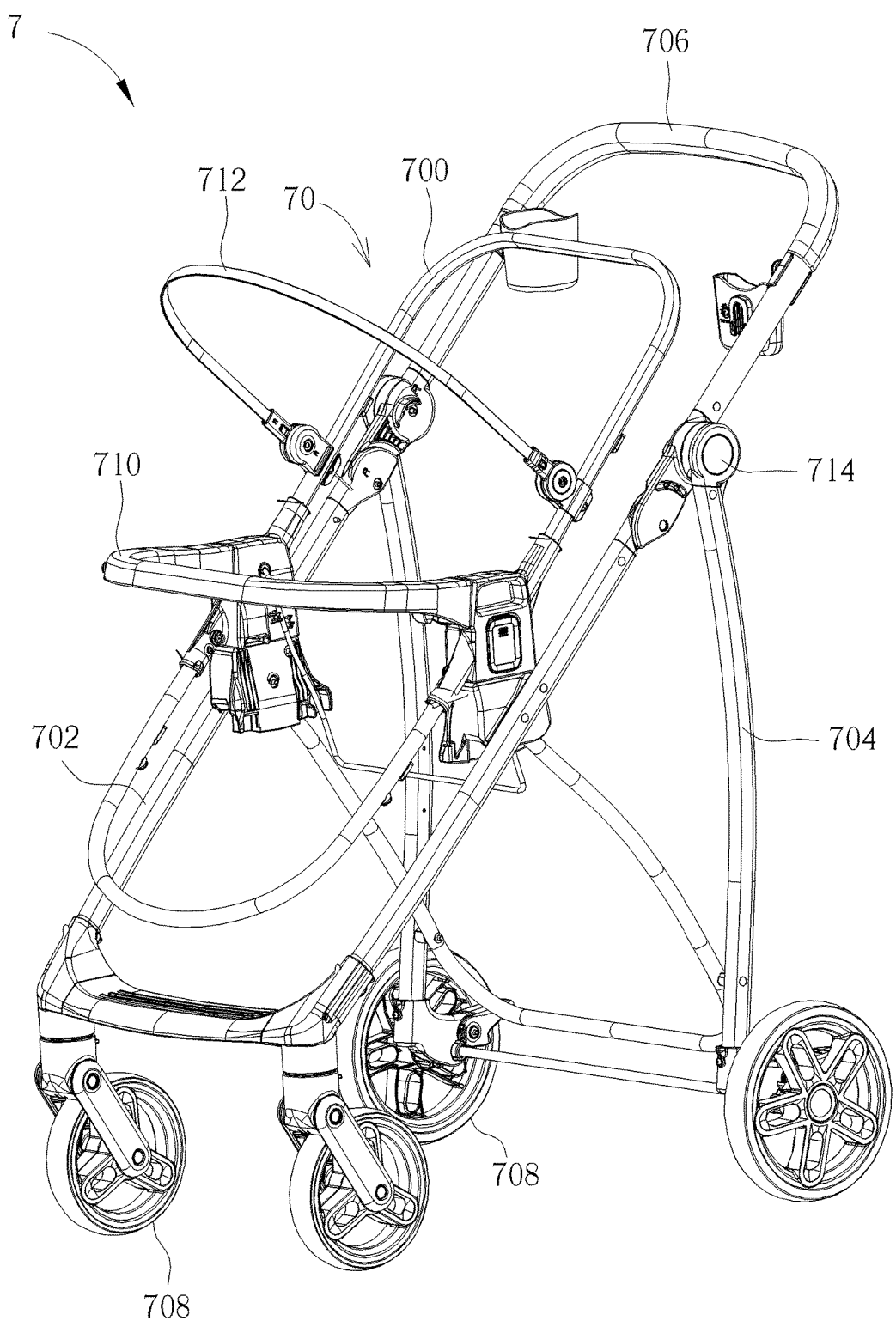
FIG. 16 is a perspective view illustrating a baby carriage according to a tenth embodiment of the invention.

Referring to FIG. 16, FIG. 16 is a perspective view illustrating a baby carriage 7 according to a tenth embodiment of the invention. As shown in FIG. 16, the baby carriage 7 comprises a frame 70. In this embodiment, the baby carriage 7 may be a stroller. Furthermore, the baby carriage 7 further comprises the aforesaid cushion. Since the features of the cushion have been depicted in detail in the above, only the features of the frame 70 are depicted in the following.

As shown in FIG. 16, the frame 70 comprises a seat 700, a front leg frame 702, a rear leg frame 704, a handle 706 and a plurality of wheels 708. The seat 700 is disposed on the front leg frame 702. The rear leg frame 704 is pivotally connected to the front leg frame 702, such that the front leg frame 702 and the rear leg frame 704 are capable of being expanded or folded with respect to each other. The handle 706 is disposed on the front leg frame 702. The wheels 708 are pivotally connected to the front leg frame 702 and the rear leg frame 704. Accordingly, the frame 70 can move on a support plane by the wheels 708.

In this embodiment, the frame 70 may further comprise a tray 710 and a canopy bar 712. The tray 710 is disposed on the seat 700 and the canopy bar 712 is pivotally connected to the seat 700. In practical applications, a canopy may be disposed on the canopy bar 712, so as to provide a cover function.

In this embodiment, the frame 70 may further comprise a lock mechanism 714 disposed on a joint between the front leg frame 702 and the rear leg frame 704. When the front leg frame 702 and the rear leg frame 704 are expanded with respect to each other, the lock mechanism 714 locks the front leg frame 702 and the rear leg frame 704, such that the front leg frame 702 and the rear leg frame 704 are kept at the expanded state shown in FIG. 16. When the lock mechanism 714 releases the front leg frame 702 and the rear leg frame 704, the front leg frame 702 and the rear leg frame 704 are capable of being folded with respect to each other. Therefore, when the user wants to store or transport the frame 70, the user can operate the lock mechanism 714 to release the front leg frame 702 and the rear leg frame 704. At this time, the user can fold the front leg frame 702 and the rear leg frame 704 with respect to each other, so as to reduce the volume of the frame 70. Consequently, the frame 70 can be stored or transported conveniently.

In this embodiment, the invention may dispose a support fabric (not shown) in the seat 700 first and then dispose the aforesaid cushion on the support fabric, so as to dispose the cushion on the frame 70. It should be noted that the reinforcing plates disposed in the cushion may be formed as one single reinforcing plate, so the invention is not limited to a plurality of reinforcing plates. In other words, the invention may change the size of the reinforcing plate according to practical applications, so as to enable the size of one single reinforcing plate to match the size of the seat 700 of the frame 70.

Figure 17:
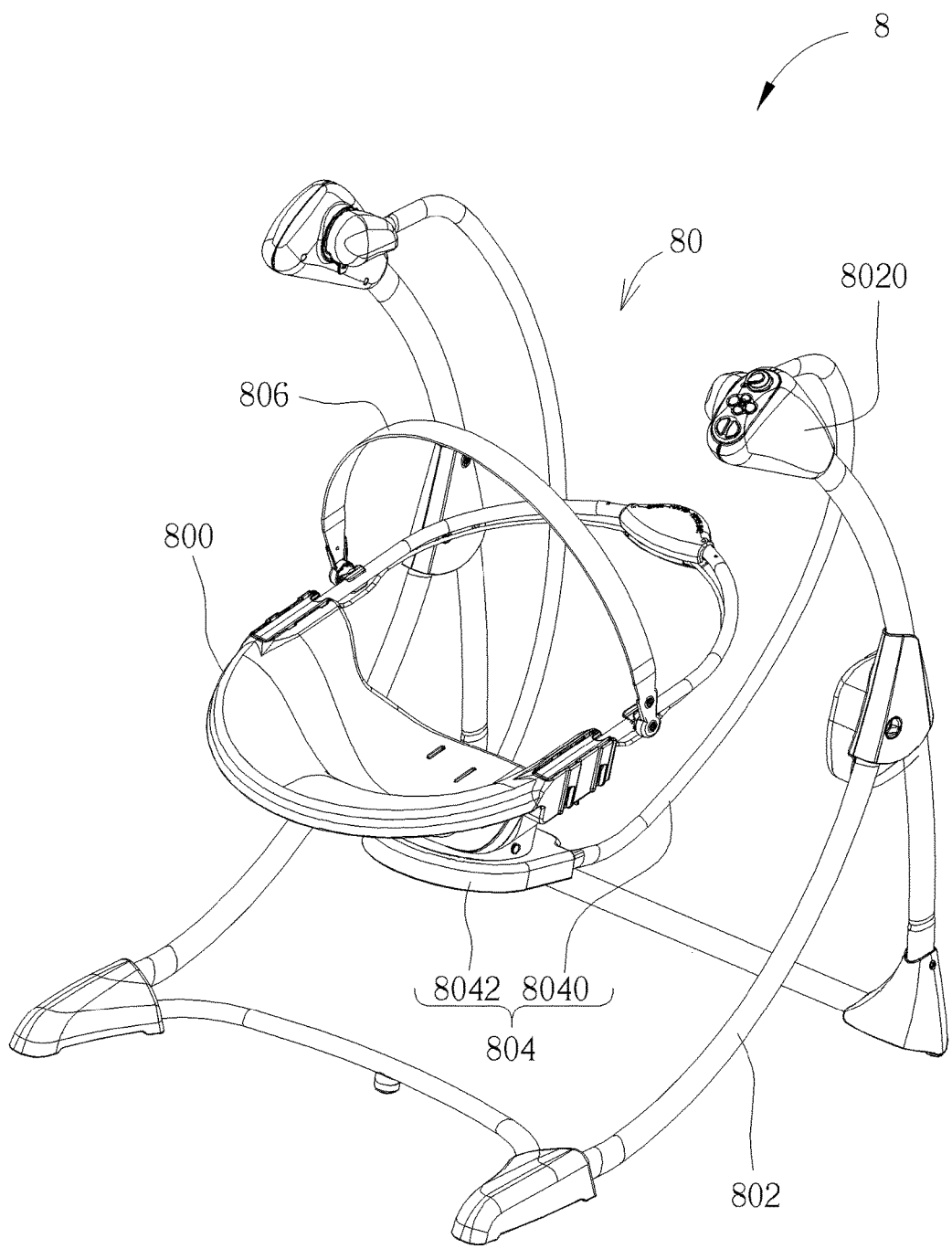
FIG. 17 is a perspective view illustrating a baby carriage according to an eleventh embodiment of the invention.

Referring to FIG. 17, FIG. 17 is a perspective view illustrating a baby carriage 8 according to an eleventh embodiment of the invention. As shown in FIG. 17, the baby carriage 8 comprises a frame 80. In this embodiment, the baby carriage 8 may be a swing. Furthermore, the baby carriage 8 further comprises the aforesaid cushion. Since the features of the cushion have been depicted in detail in the above, only the features of the frame 80 are depicted in the following.

As shown in FIG. 17, the frame 80 comprises a seat 800, a support frame 802 and a swing device 804. The swing device 804 is pivotally connected to the support frame 802, such that the swing device 804 is capable of swinging with respect to the support frame 802. The seat 800 is disposed on the swing device 804. Accordingly, when the swing device 804 is swinging with respect to the support frame 802, the swing device 804 drives the seat 800 to swing.

In this embodiment, the swing device may comprise two swing arms 8040 and a base 8042, wherein the two swing arms 8040 are pivotally and symmetrically connected to the support frame 802. The base 8042 is connected to the two swing arms 8040 and the seat 800 is disposed on the base 8042. Furthermore, the support frame 802 may comprise a driving mechanism 8020, wherein the swing arms 8040 are pivotally connected to the driving mechanism 8020. The driving mechanism 8020 can drive the swing arms 8040 to swing and control a swing range of the swing arms 8040.

In this embodiment, the frame 80 may further comprise a canopy bar 806, wherein the canopy bar 806 is pivotally connected to the seat 800. In practical applications, a canopy may be disposed on the canopy bar 806, so as to provide a cover function.

In this embodiment, the invention may dispose the aforesaid cushion on the seat 800 of the frame 80. It should be noted that the reinforcing plates disposed in the cushion may be formed as one single reinforcing plate, so the invention is not limited to a plurality of reinforcing plates. In other words, the invention may change the size of the reinforcing plate according to practical applications, so as to enable the size of one single reinforcing plate to match the size of the seat 800 of the frame 80.

Figure 18:
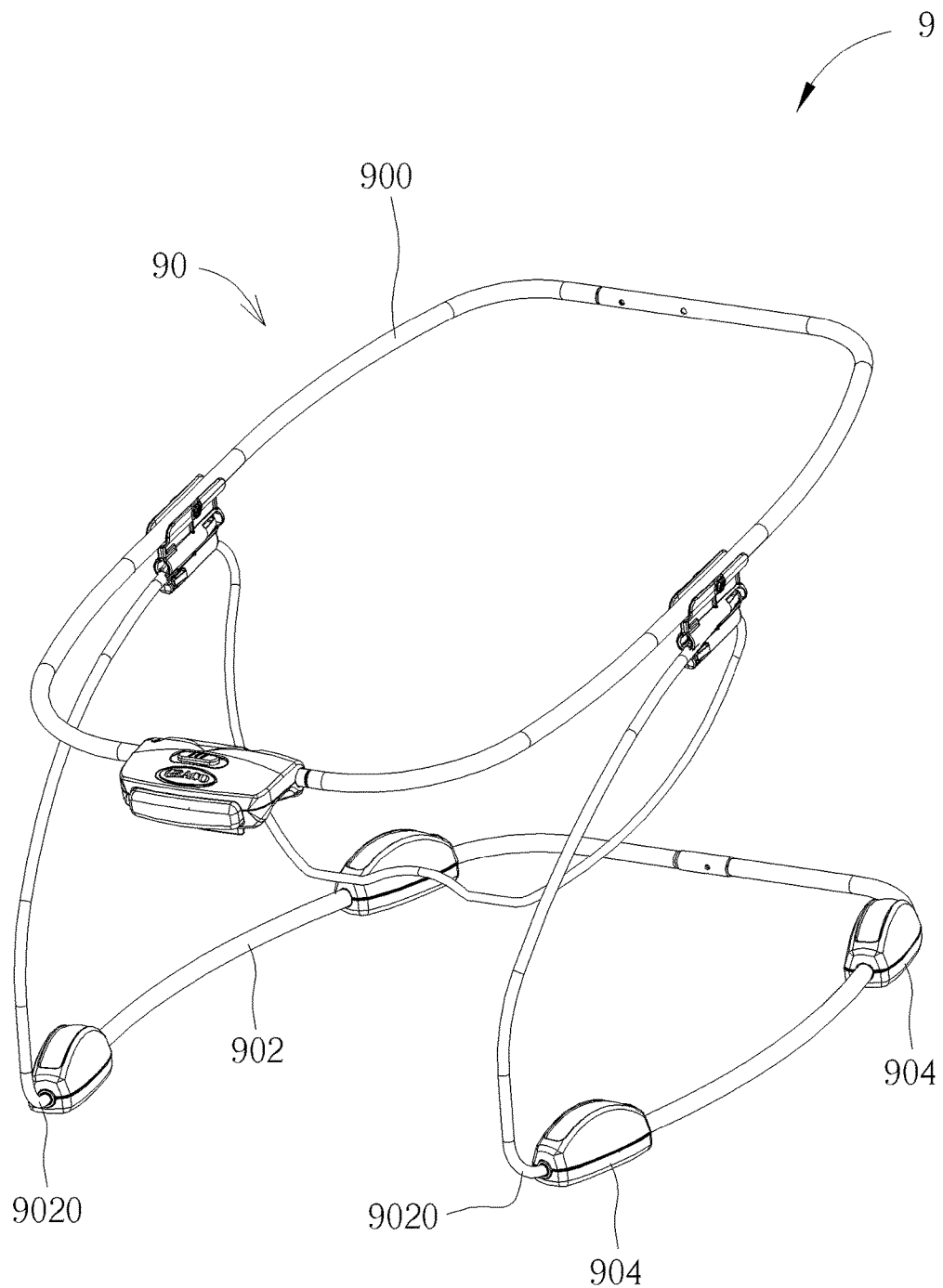
FIG. 18 is a perspective view illustrating a baby carriage according to a twelfth embodiment of the invention.

Referring to FIG. 18, FIG. 18 is a perspective view illustrating a baby carriage 9 according to a twelfth embodiment of the invention. As shown in FIG. 18, the baby carriage 9 comprises a frame 90. In this embodiment, the baby carriage 9 may be a bouncer. Furthermore, the baby carriage 9 further comprises the aforesaid cushion. Since the features of the cushion have been depicted in detail in the above, only the features of the frame 90 are depicted in the following.

As shown in FIG. 18, the frame 90 comprises a seat 900 and a support frame 902. The seat 900 is disposed on the support frame 902. The support frame 902 has two bending portions 9020. When the seat 900 is pressed, the two bending portions 9020 deform and generate an elastic force to bounce the seat 900 upwardly, such that the seat 900 bounces.

In this embodiment, the frame 90 may further comprise a plurality of pedestals 904 sleeved on the support frame 902, such that the frame 90 can be placed on a support plane stably by the pedestals 904.

In this embodiment, the invention may dispose a support fabric (not shown) in the seat 900 first and then dispose the aforesaid cushion on the support fabric, so as to dispose the cushion on the frame 90. It should be noted that the reinforcing plates disposed in the cushion may be formed as one single reinforcing plate, so the invention is not limited to a plurality of reinforcing plates. In other words, the invention may change the size of the reinforcing plate according to practical applications, so as to enable the size of one single reinforcing plate to match the size of the seat 900 of the frame 90.

Figure 19:
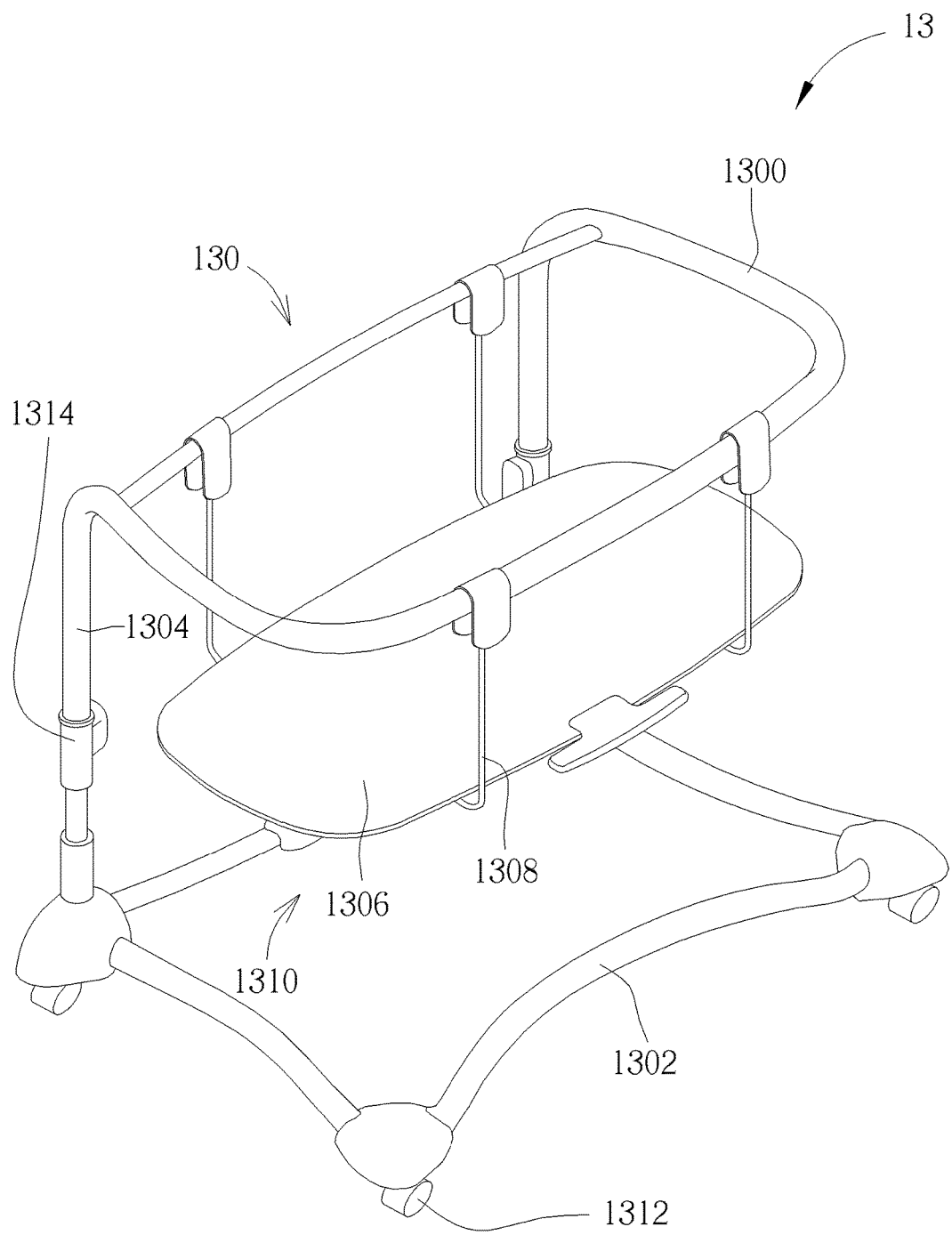
FIG. 19 is a perspective view illustrating a baby carriage according to a thirteenth embodiment of the invention.

Referring to FIG. 19, FIG. 19 is a perspective view illustrating a baby carriage 13 according to a thirteenth embodiment of the invention. As shown in FIG. 19, the baby carriage 13 comprises a frame 130. In this embodiment, the baby carriage 13 may be a bedside bed. Furthermore, the baby carriage 13 further comprises the aforesaid cushion. Since the features of the cushion have been depicted in detail in the above, only the features of the frame 130 are depicted in the following.

As shown in FIG. 19, the frame 130 comprises an upper support frame 1300, a lower support frame 1302, two upright posts 1304 and a bed 1306. The two upright posts 1304 are connected to the upper support frame 1300 and the lower support frame 1302 correspondingly, such that the upper support frame 1300, the lower support frame 1302 and the two upright posts 1304 are U-shaped. The bed 1306 is disposed on the upper support frame 1300. In this embodiment, the frame may further comprise a plurality of arms 1308. Opposite ends of each arm 1308 are pivotally connected to the upper support frame 1300 and the bed 1306, such that the bed 1306 can be disposed on the upper support frame 1300 through the arms 1308. Since opposite ends of each arm 1308 are pivotally connected to the upper support frame 1300 and the bed 1306, the bed 1306 can swing with respect to the upper support frame 1300 by the arms 1308.

In this embodiment, a space 1310 exists between the bed 1306 and the lower support frame 1302. Accordingly, the lower support frame 1302 may be pushed into a space under a sleeping bed (not shown), such that the bed 1306 is located above the sleeping bed. Consequently, a caregiver lying on the sleeping bed can take care of a baby lying on the bed 1306 conveniently. Furthermore, the frame 130 further comprises a plurality of wheels 1312 pivotally connected to the lower support frame 1302. Accordingly, the frame 130 can move on a support plane by the wheels 1312.

In this embodiment, the frame 130 may further comprise two height adjusting mechanisms 1314, wherein each of the height adjusting mechanisms 1314 is disposed on the upright post 1304 correspondingly. The height adjusting mechanism 1314 is capable of being operated to adjust a height of the upright post 1304. In other words, the upright post 1304 is retractable. The user can operate the height adjusting mechanism 1314 to adjust the height of the upright post 1304, so as to adjust the height of the frame 130.

In this embodiment, the invention may dispose the aforesaid cushion on the bed 1306 of the frame 130. It should be noted that the reinforcing plates disposed in the cushion may be formed as one single reinforcing plate, so the invention is not limited to a plurality of reinforcing plates. In other words, the invention may change the size of the reinforcing plate according to practical applications, so as to enable the size of one single reinforcing plate to match the size of the bed 1306 of the frame 130.

Figure 20:
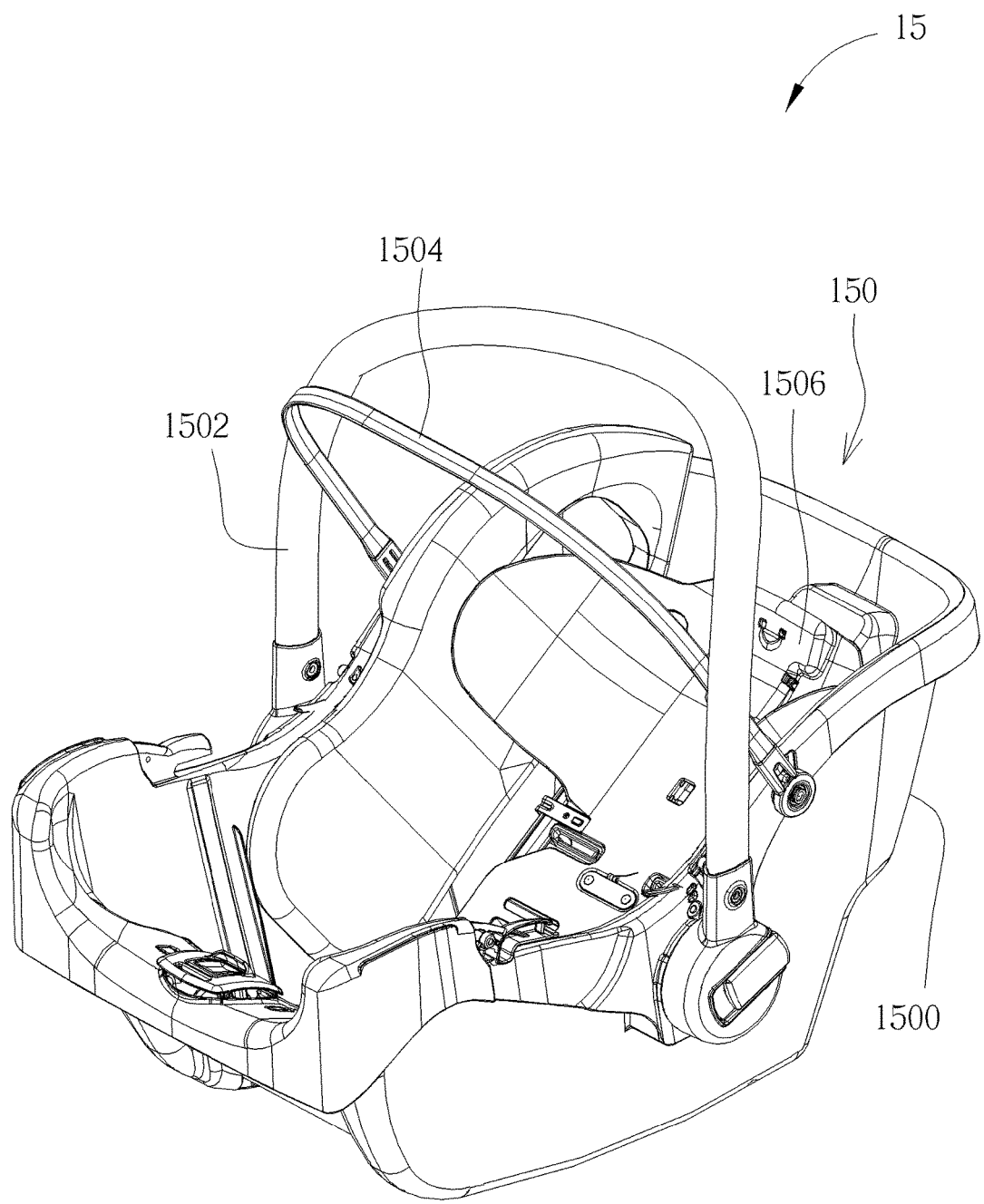
FIG. 20 is a perspective view illustrating a baby carriage according to a fourteenth embodiment of the invention.

Referring to FIG. 20, FIG. 20 is a perspective view illustrating a baby carriage 15 according to a fourteenth embodiment of the invention. As shown in FIG. 20, the baby carriage 15 comprises a frame 150. In this embodiment, the baby carriage 15 may be an infant car seat. Furthermore, the baby carriage 15 further comprises the aforesaid cushion. Since the features of the cushion have been depicted in detail in the above, only the features of the frame 150 are depicted in the following.

As shown in FIG. 20, the frame 150 comprises a shell 1500, a handle 1502, a canopy bar 1504 and a headrest 1506. The handle 1502 is pivotally connected to the shell 1500. The user can hold the handle 1502 to transport the baby carriage 15. The canopy bar 1504 is pivotally connected to the shell 1500. In practical applications, a canopy may be disposed on the canopy bar 1504, so as to provide a cover function. The headrest 1506 is disposed in the shell 1500. When an infant is seated in the shell 1500, a head of the infant can lean against the headrest 1506.

In this embodiment, the invention may dispose the aforesaid cushion on the shell 1500 of the frame 150. It should be noted that the reinforcing plates disposed in the cushion may be formed as one single reinforcing plate, so the invention is not limited to a plurality of reinforcing plates. In other words, the invention may change the size of the reinforcing plate according to practical applications, so as to enable the size of one single reinforcing plate to match the size of the shell 1500 of the frame 150.

Figure 21:
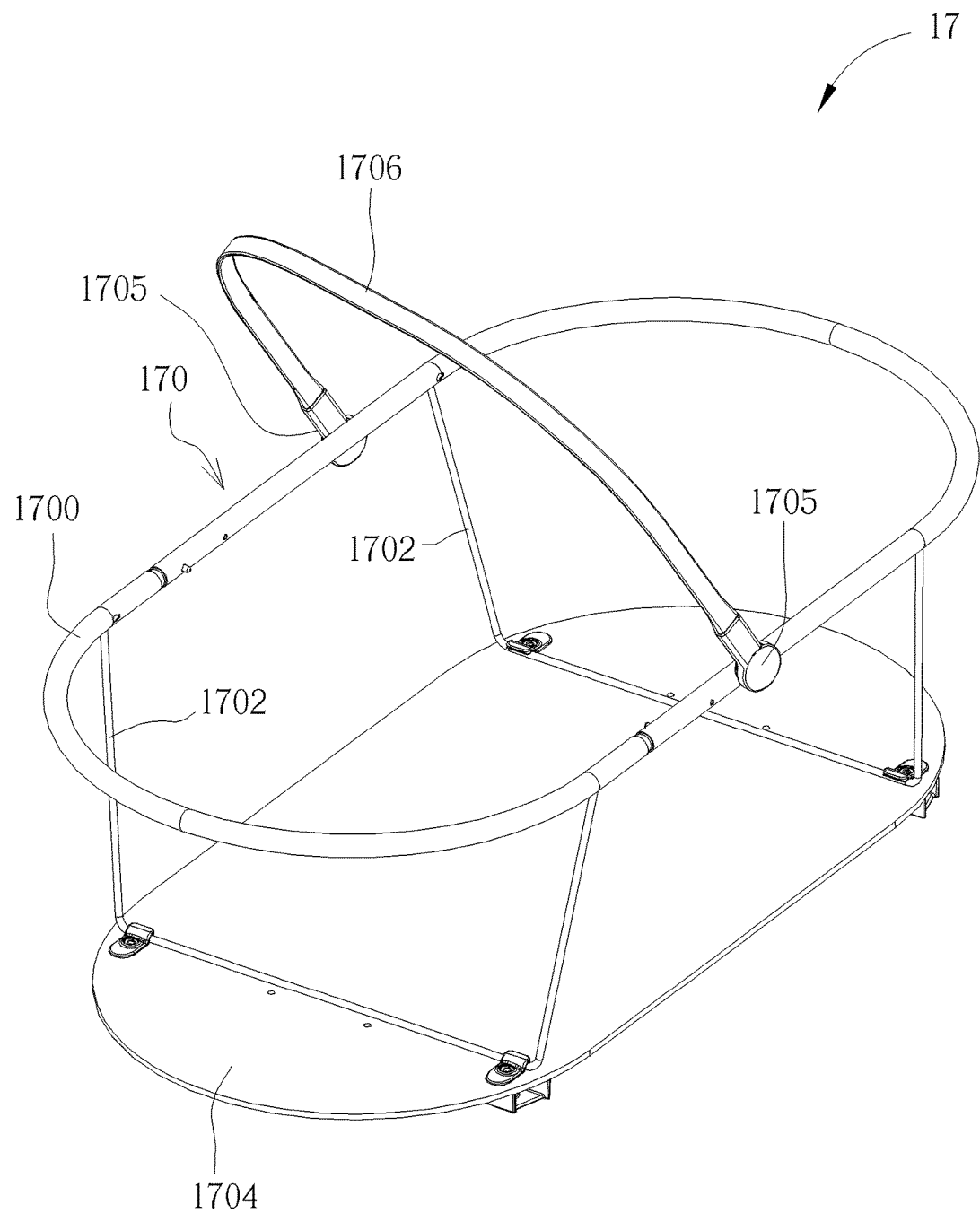
FIG. 21 is a perspective view illustrating a baby carriage according to a fifteenth embodiment of the invention.

Referring to FIG. 21, FIG. 21 is a perspective view illustrating a baby carriage 17 according to a fifteenth embodiment of the invention. As shown in FIG. 21, the baby carriage 17 comprises a frame 170. In this embodiment, the baby carriage 17 may be a carry cot. Furthermore, the baby carriage 17 further comprises the aforesaid cushion. Since the features of the cushion have been depicted in detail in the above, only the features of the frame 170 are depicted in the following.

As shown in FIG. 21, the frame 170 comprises an upper support frame 1700, two connecting members 1702, a bed 1704 and a handle 1706. The two connecting members 1702 are connected to the upper support frame 1700 and the bed 1704. The handle 1706 is pivotally connected to the upper support frame 1700 through two connecting members 1705. The user can hold the handle 1706 to transport the baby carriage 17. In practical applications, the invention may utilize a fabric to cover the periphery of the frame 170. Furthermore, the connecting members 1705 may be connected to a connecting member of a stroller, such that the baby carriage 17 may be assembled with the stroller.

In this embodiment, the invention may dispose the aforesaid cushion on the bed 1704 of the frame 170. It should be noted that the reinforcing plates disposed in the cushion may be formed as one single reinforcing plate, so the invention is not limited to a plurality of reinforcing plates. In other words, the invention may change the size of the reinforcing plate according to practical applications, so as to enable the size of one single reinforcing plate to match the size of the bed 1704 of the frame 170.

As mentioned in the above, the invention disposes the reinforcing rib on the bottom surface of the reinforcing plate, so as to reinforce structural strength of the reinforcing plate by the reinforcing rib. Since the gap exists between the end of the curved section and one of the straight section and the curved section (i.e. the end of the curved section is not connected to the straight section or the curved section), stress concentration will not occur when the reinforcing rib is forced by an external force, such that the reinforcing plate will not break or be damaged easily. Furthermore, the reinforcing rib of the invention may be P-shaped, such that a non-closed space may be formed between a part of the straight section and the curved section. Since some through holes are located in the non-closed space formed by the reinforcing rib, the through holes in the non-closed space can contact with a baby sufficiently when the baby lies on the cushion, so as to improve ventilation, enhance coziness and reduce suffocation risk. Moreover, the cushion of the invention can be applied to different baby carriages including a crib, a stroller, a bedside bed, a carry cot, a rocker, a dining chair, a swing, a car seat, a bouncer, a high chair, an infant car seat, and so on.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A baby carriage comprising:
a frame; and
a cushion disposed on the frame, the cushion comprising a plurality of reinforcing plates and a fabric cover, the reinforcing plates being disposed in the fabric cover, the reinforcing plates being arranged side by side and separated from each other, at least one of the reinforcing plates comprising a plate body and a first reinforcing rib, the plate body having a plurality of through holes formed thereon, the first reinforcing rib being located on a bottom surface of the plate body, the first reinforcing rib comprising a straight section and a curved section, the curved section extending from the straight section, a gap existing between an end of the curved section and one of the straight section and the curved section.

2. The baby carriage of claim 1, wherein the curved section comprises a first curved portion, a first straight portion, a second curved portion and a second straight portion, the first curved portion extends from the straight section, the first straight portion extends from the first curved portion, the second curved portion extends from the first straight portion, and the second straight portion extends from the second curved portion.

3. The baby carriage of claim 2, wherein the curved section further comprises a third curved portion and a third straight portion, the third curved portion extends from the second straight portion, the third straight portion extends from the third curved portion, and the third straight portion provides the end of the curved section.

4. The baby carriage of claim 3, wherein the second straight portion is substantially parallel to the straight section, and the first straight portion and the third straight portion are substantially perpendicular to the straight section.

5. The baby carriage of claim 1, wherein a non-closed space is formed between a part of the straight section and the curved section, and at least two of the through holes are located in the non-closed space.

6. The baby carriage of claim 1, wherein each of the reinforcing plates further comprises a second reinforcing rib, a structure of the second reinforcing rib is identical to a structure of the first reinforcing rib, and the first reinforcing rib and the second reinforcing rib are located at the bottom surface of the plate body symmetrically.

7. The baby carriage of claim 6, wherein the first reinforcing rib and the second reinforcing rib are separated from each other.

8. The baby carriage of claim 1, wherein the cushion further comprises a permeable layer disposed in the fabric cover and located on the reinforcing plates.

9. The baby carriage of claim 1, wherein the cushion further comprises a plurality of permeable layers disposed in the fabric cover, and each of the permeable layers is located on one of the reinforcing plates.

10. The baby carriage of claim 1, wherein the fabric cover has a plurality of stitched lines, and each of the stitched lines separates two adjacent reinforcing plates from each other.

11. The baby carriage of claim 10, wherein the cushion is selectively folded or expanded through the stitched lines.

12. The baby carriage of claim 1, wherein the first reinforcing rib essentially consists of a first side wall, a second side wall and a plurality of connecting portions, the first side wall and the second side wall are arranged side by side and separated from each other, and the connecting portions are located between the first side wall and the second side wall and connect the first side wall and the second side wall.

13. The baby carriage of claim 1, wherein each of the reinforcing plates further comprises a reinforcing structure and reinforcing structure surrounds a periphery of the reinforcing plate.

14. The baby carriage of claim 13, wherein the reinforcing structure is a hollow structure.

15. The baby carriage of claim 13, wherein at least one corner of the reinforcing structure and at least one corner of the reinforcing plate are separated from each other.

16. The baby carriage of claim 1, wherein the through holes have at least two different sizes.

17. The baby carriage of claim 1, wherein a zipper is disposed on a side of the fabric cover such that the reinforcing plate can be taken out of the fabric cover.

18. The baby carriage of claim 1, wherein the frame comprising an upper support frame, a lower support frame and a plurality of upright posts and opposite ends of the upright post are connected to the upper support frame and the lower support frame.

19. The baby carriage of claim 1, wherein the frame comprises a seat and a support frame and the seat is disposed on the support frame.

20. The baby carriage of claim 1, wherein the frame comprises a seat and a backrest and the backrest is disposed on the seat.

21. The baby carriage of claim 1, wherein the frame comprises a seat, a curved base and a support frame, and the support frame is connected to the seat and the curved base.

22. The baby carriage of claim 1, wherein the frame comprises a seat, a front leg frame, a rear leg frame, a handle and a plurality of wheels, the seat is disposed on the front leg frame, the rear leg frame is pivotally connected to the front leg frame, such that the front leg frame and the rear leg frame are capable of being expanded or folded with respect to each other, the handle is disposed on the front leg frame, and the wheels are pivotally connected to the front leg frame and the rear leg frame.

23. The baby carriage of claim 1, wherein the frame comprises a seat, a support frame and a swing device, the swing device is pivotally connected to the support frame, such that the swing device is capable of swinging with respect to the support frame, and the seat is disposed on the swing device.

24. The baby carriage of claim 1, wherein the frame comprises a seat and a support frame, the seat is disposed on the support frame, the support frame has two bending portions, and the two bending portions deform and generate an elastic force to bounce the seat upwardly when the seat is pressed, such that the seat bounces.

25. The baby carriage of claim 1, wherein the frame comprises an upper support frame, a lower support frame, two upright posts and a bed, the two upright posts are connected to the upper support frame and the lower support frame correspondingly, and the bed is disposed on the upper support frame.

26. The baby carriage of claim 1, wherein the frame comprises a shell and a handle and the handle is pivotally connected to the shell.

27. The baby carriage of claim 1, wherein the frame comprises an upper support frame, two connecting members and a bed, and the two connecting members are connected to the upper support frame and the bed.

* * * * *